US005903529A

United States Patent [19]
Nishi et al.

[11] Patent Number: 5,903,529
[45] Date of Patent: May 11, 1999

[54] OPTICAL PICKUP DEVICE AND DISK PLAYER APPARATUS

[75] Inventors: Noriaki Nishi, Chiba; Kimihiro Saito, Saitama; Kazuyoshi Horie, Chiba; Yasuo Sasaki, Kanagawa; Kenji Araki; Kazuhiko Okamatsu, both of Chiba, all of Japan

[73] Assignee: Sony Corporation, Tokyo, Japan

[21] Appl. No.: 08/919,788

[22] Filed: Aug. 29, 1997

[30] Foreign Application Priority Data

Aug. 30, 1996 [JP] Japan .................................. 8-231050

[51] Int. Cl.⁶ ....................................................... G11B 7/12
[52] U.S. Cl. ..................................... 369/44.23; 369/44.14; 369/44.41; 369/112
[58] Field of Search ............................. 369/44.23, 44.14, 369/44.12, 44.28, 44.41, 44.42, 112, 110, 111, 13

[56] References Cited

U.S. PATENT DOCUMENTS

| | | | |
|---|---|---|---|
| 5,583,843 | 12/1996 | Horinouchi | 369/112 X |
| 5,732,060 | 3/1998 | Toyota at al. | 369/112 |
| 5,745,265 | 4/1998 | Hasegawa et al. | 369/112 X |

*Primary Examiner*—Muhammad N. Edun
*Attorney, Agent, or Firm*—Ronald P. Kananen; Rader, Fishman & Grauer PLLC

[57] ABSTRACT

A small size, high performance optical pickup device using a light reception/emission element (laser coupler) and more particularly, an optical pickup device which is capable of excellent recording and reproduction for a magnetic optical recording medium. A prism disposed over optical detectors is made of double refractive crystal material. An optical detector for receiving extraordinary ray is formed at a position laterally deviated corresponding to so-called walk-off of the extraordinary ray. Tracking error signal is detected depending on a distribution of intensities of spots formed by reflective beams on respective optical detectors.

11 Claims, 23 Drawing Sheets

FIG.32A  ORDINARY RAY

FIG.32B  EXTRAORDINARY RAY

OPTICAL PICKUP DEVICE AND DISK PLAYER APPARATUS

BACKGROUND OF THE INVENTION

1. Field of the Invention

This invention relates to an optical pickup device for writing and reading information signal into/from a magnetic optical recording medium such as an optical disk and magnetic optical disk, and a disk player apparatus for recording and reproducing information signal in the optical disk or magnetic optical disk including the aforementioned optical pickup device.

2. Description of the Related Art

Conventionally, various types of optical recording mediums such as an optical disk (bit recording disk, phase change type disk, rewrite type disk, etc.) and magnetic optical disk have been proposed. Such an optical recording medium includes a transparent substrate and a signal recording layer formed thereon. In the optical disk and magnetic optical disk, its substrate is formed in the form of a circular disk. In the optical disk or magnetic optical disk, information signal is recorded in recording tracks formed in substantially coaxial spiral shape, in the signal recording layer.

An optical pickup device for writing and reading information signal into/from a magnetic optical disk 101 which is an optical recording medium, as shown in FIG. 1, has been proposed. This optical pickup device includes a semiconductor laser 201 as a light source. Beam emitted from the semiconductor laser 201 is converged and irradiated to a signal recording surface of the magnetic optical disk 101 by means of an objective lens 205, that is, to the surface of a signal recording layer 102. Beam emitted from the semiconductor laser 201, passing through a grating (diffraction grating) 202, a beam splitter 203 and a collimator lens 204, is introduced to an objective lens 205. The grating 202 enables detection of tracking error signal which will be described later.

In this optical pickup device, by detecting beam irradiated to the signal recording surface and then reflected thereby by means of an optical detector (P.D.: photo diode) 209, information signal recorded in the signal recording layer 102 of the magnetic optical disk 101 is read out and further error signals, that is, focus error signal and tracking error signal are detected in order to maintain convergence of beam upon the signal recording surface.

Reflected beam, passing through the objective lens 205 and the collimator lens 204, returns to the beam splitter 203. This reflected beam is reflected by the beam splitter 203 and, passing through a Wollaston prism 207 and a multi-lens 208, impinges upon an optical detector 209. The Wollaston prism 207 divides beam corresponding to polarization component of the impinging beam. The multi-lens 208 has a cylindrical surface as an incident surface and a concave surface as an emission surface. This lens causes astigmatism for detecting the focus error signal, in the impinging beam, and retracts a converging point for the incident beam.

The focus error signal is a signal for indicating a distance between a convergent point of beam and the signal recording surface, in the direction of optical axis of the objective lens 205. In the optical pickup device, as indicated by the arrow F in FIG. 1, the objective lens 205 is moved in the direction of the optical axis thereof until the focus error signal becomes 0, that is, focus servo action is conducted.

The tracking error signal is a signal for indicating a distance between the convergent point of beam and the recording track in a direction perpendicular to a tangent line of the recording track and an optical axis of the objective lens 205, namely, in the direction of a radius of the magnetic optical disk 101. In this optical pickup device, as indicated by the arrow T in FIG. 1, the objective lens 205 is moved in a direction perpendicular to the optical axis of the objective lens 205 until the tracking error signal becomes 0, namely, tracking servo action is conducted.

Additionally, in an optical pickup device for use in reproduction of an optical disk specially designed for read only or a bit disk such as a compact disk (so-called CD), an integrated type light reception/emission element shown in FIG. 2 has been conventionally employed.

The optical pickup device 210 includes an objective lens 211, optical path bending mirrors 212, 213 and a light reception/emission element 214. Beam emitted from the light reception/emission element 214 is converged to the signal recording surface of the optical disk (CD) 103 through the optical path bending mirrors 212, 213 and the objective lens 211.

The light reception/emission element 214 is composed as an integrated optical block containing a light emission element and a light reception element, as shown in FIG. 3. In this light reception/emission element 214, a second semiconductor substrate 216 is placed upon a first semiconductor substrate 215, and a semiconductor laser chip 217 which is a light emission element is mounted on the second semiconductor substrate 216.

A trapezoidal prism 218 having an inclined face (optical path branching surface) on a side of the semiconductor laser chip 217 is disposed on the first semiconductor substrate 215 forward of the semiconductor laser chip 217. On this optical path branching surface is formed a non-polarization semi-transmission film 218a as a beam splitter. Further, full reflecting film 218b is formed on the top face of the prism 218 and non-polarization semi-transmission film 218c is formed on the bottom face thereof.

Then, the prism 218 reflects beam emitted from the semiconductor laser chip 217 by its optical path branching surface so as to project the beam outside of the light reception/emission element 214. As shown in FIG. 2, the beam emitted from the light reception/emission element 214 is sent to the objective lens 211 through the optical path bending mirrors 213, 212, so that it is converged to the signal recording surface of the optical disk 103 through the objective lens 211.

The reflective beam reflected by the signal recording surface of the optical disk 101 passes through the objective lens 211 and the optical path bending mirrors 212, 213, and then impinges into the prism 218 through the inclined surface of the prism 218 of the light reception/emission element 214. The impinging beam is reflected by the bottom face and the top face of the prism 218. The beam emanates from the prism 218 downward at two positions thereof.

On a top face of the first semiconductor substrate 215 are formed a first and second optical detectors 219a, 219b for receiving beam emanating from the two points of the bottom face of the prism 218.

As shown in FIG. 4, the optical detectors 219a, 219b are divided to four portions, namely, division light reception portions (a, b, c, d), (e, f, g, h) by three division lines extending in parallel in longitudinal direction in the vicinity of the central portion thereof. As a result, a signal RF read from the optical disk 101 is detected by the optical detectors 219a, 219b. If optical detection output signals from the respective division light reception portions are assumed to be Sa, Sb, Sc, Sd, Se, Sf, Sg, Sh, $$RF = Sa+Sb+Sc+Sd+Se+Sf+Sg+Sh$$

In the optical detectors 219a, 219b, a differential in detection signal between two division light reception portions of a four-divided sensor element is obtained by so-called push-pull method so as to detect tracking error signal TRK.

$$TRK = (Sa+Se)-(Sd+Sh)$$

Further, in the optical detectors 219a, 219b, focus error signal FCS is detected based on detection signals from a sensor element in the center and two sensor elements on both sides thereof, in accordance with so-called differential three-division method.

$$FCS = \{(Sa+Sd)-(Sb+Sc)\}-\{(Se+Sh)-(Sf+Sg)\}$$

For tracking error signal TRK, so-called TPP (top hold push-pull) method has been proposed to cancel DC offset caused by a move (move of field of view) of the objective lens 211 in a direction perpendicular to the optical axis thereof, accompanied by tracking servo action.

In accordance with the push-pull method, as shown in FIG. 5, the tracking error signal TRK is obtained by comparing intensities of edge portions $\beta_1$, $\beta_2$ on both sides of an optical spot $\alpha$ formed by the beam reflected on the optical disk 103, on the light reception surface of the optical detector 219. When beam emitted from the objective lens 211 is irradiated over the recording track of the optical disk 103, the edge portions $\beta_1$, $\beta_2$ on both sides have the same intensity. Then, if the irradiation position for beam emitted from the objective lens 211 is deviated from the recording track, the intensities of the edge portions $\beta_1$, $\beta_2$ on both sides become different from each other as shown in FIG. 6. However, if the objective lens 211 is moved so that the field of view is also moved, the beam spot $\alpha$ on the light receiving surface of the optical detector 219 is also moved, so that DC offset occurs in the tracking error signal TRK.

If the detection output E from the division light reception portion E which receives one side edge $\beta_1$, of the beam spot $\alpha$ is considered, a peak of the RF envelop waveform of the detection signal E is changed in a range indicated by the arrow a in FIG. 7, if the field of view is moved. The signal A obtained by passing the RF envelop of the detection output E through a low-pass filter (LPF) is utilized for detection of the tracking error in accordance with the push-pull method. The signal A undergoes a change in offset, in a range indicated by the arrow b in FIG. 7 if the field of view is moved. Thus, if a change in the offset is subtracted from the signal A, the DC offset can be canceled. Here, if such a constant K (<1) in which b=Ka is determined, a signal which cancels the offset is indicated by the signal A−Ka. The same thing can be said for the detection output F from a division light reception portion F which receives a region $\beta_2$ on the other side of the beam spot $\alpha$. As described above, the TPP method obtains the tracking error signal TRK by means of the signal which cancels the offset.

That is, in accordance with the TPP method as shown in FIG. 8, in order to obtain a top hold of the detection output E from the division light reception portion E which receives an edge portion $\beta_1$ on one side of the beam spot $\alpha$, a coefficient K is multiplied and then TPP(E) is obtained by subtracting the detection output E from this signal. On the other hand, in order to obtain a top hold of the detection output F from the division light reception portion F which receives an edge portion $\beta_2$ on the other side of the beam spot $\alpha$, the coefficient K is multiplied and then TPP(F) is obtained by subtracting the detection output F from this signal. Then, the TPP signal can be obtained by subtracting TPP(F) from the signal TPP(E) (TPP=TPP(E)−TPP(F)).

Further, as a method for eliminating an offset in the tracking error signal in a groove disk having wobble grooves, which is one of the above magnetic optical disk 101, a method for using changes in the wobble component has been proposed.

Meanwhile, in the above optical pickup device for the magnetic optical recording medium, a number of optical devices such as the semiconductor laser 201, the optical detector 209, the beam splitter 203 and the like are mounted individually in an optical block. Steps for production, assembly and adjustment for the optical devices are complicated. Further, reduction of their sizes, improvement of their performance and enhancement of their durability are hard works to overcome.

For an optical pickup device using the above light reception/emission element, its assembly step and adjustment step are easy and reduction of the size, improvement of the performance and enhancement of the durability can be achieved. However, this optical pickup device cannot be used as an optical pickup device in which so-called non-polarization type optical system is utilized and information signal is written or read into/from a magnetic optical recording medium.

Therefore, in order to apply the aforementioned light reception/emission element to the optical pickup device for recording and reproduction for the magnetic optical disk, it is necessary to dispose a parallel flat, half-wave plate 18d between the prism 18 and the first semiconductor substrate 15 as shown in FIG. 9, and further employ P beam splitter (polarized beam splitter) 18e having analyzer function, instead of the non-polarization semi-transmission film 218c which is a beam splitter.

However, if the P beam splitter 18e is utilized only as the beam splitter as described above, in the conventional light reception/emission element, a central value of the incident angles of beam which impinges upon a position of the P beam splitter is as small as about 21°. Thus, a beam splitter formed of multi-layer film cannot be used. Further, the number of parts of the prism 18 increases, so that production step becomes complicated and at the same time, production cost and assembly cost increase.

SUMMARY OF THE INVENTION

Accordingly, the present invention has been proposed to solve the above problems, and an object of the present invention is to provide an optical pickup device which enables its assembly process and adjustment process to be facilitated and realizes reduction of size thereof, improvement of performance thereof, and enhancement of durability thereof, and which is capable of writing and reading information signal into/from a magnetic optical recording medium.

Another object thereof is to provide a disk player apparatus having the aforementioned optical pickup device so as to ensure an excellent recording and reproduction characteristic for the magnetic optical recording medium.

DETAILED DESCRIPTION OF THE PREFERRED EMBODIMENTS

Hereinafter embodiments of the present invention will be described with reference to the accompanying drawings.

Figure 10:
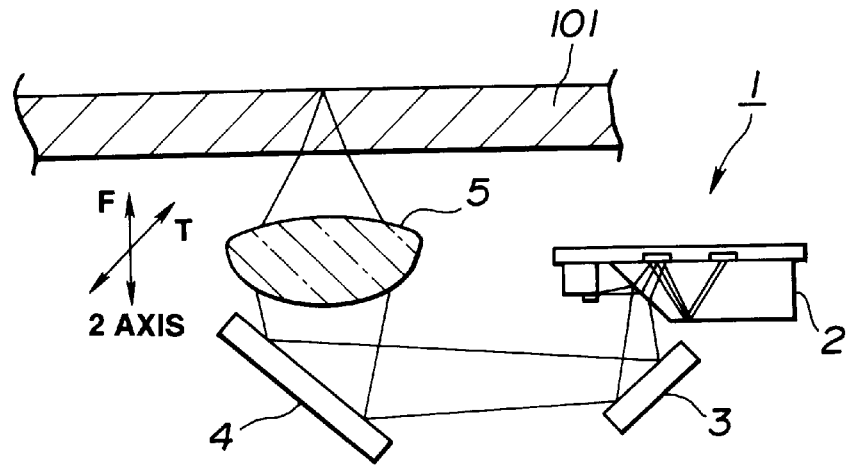
FIG. 10 is a side view of an optical pickup device according to the present invention, with a partly broken portion.

According to this embodiment, an optical pickup device according to the present invention is embodied in the form of a device which writes and reads information signals into/from a magnetic optical disk 101 as a magnetic optical recording medium as shown in FIG. 10. This magnetic optical disk 101 includes a circular disk substrate made of transparent material such as polycarbonate and polymethylmethacrylate, and a signal recording layer 102 formed on this disk substrate. This signal recording layer 102 is formed of magnetic material film. A surface of the signal recording layer 102, bonded to the disk substrate serves as a signal recording face.

The optical pickup device of the present invention is structured in the form of a light reception/emission element 1 as shown in FIG. 10. The light reception/emission element 1 emits laser beam. The laser beam emitted from the light reception/emission element 1 is reflected by refracting mirrors 3, 4 and converged on the signal recording face of the magnetic optical disk 101, through the disk substrate, by means of an objective lens 5 which is a light collecting means composing a disk player apparatus which will be described later.

The light reception/emission element includes a first semiconductor substrate 6, on which a semiconductor laser chip 8 serving as a light source, and first—third signal reading optical detectors 11 (PD1), 12(PD2), 13(PD3) are disposed or formed.

The semiconductor laser chip 8 is disposed on a top face of a second semiconductor substrate (heat sink portion) 7 disposed on the top face of the first semiconductor substrate 6. The respective signal reading optical detectors 11, 12, 13 are disposed on a surface of the first semiconductor substrate 6.

The semiconductor laser chip 8 emits laser beam to the side in which the respective signal reading optical detectors 11, 12, 13 are disposed, in parallel to the top face of the semiconductor 6. The beam emitted from the semiconductor laser chip 8 is divergent beam oval shaped in cross section. A vertical divergent angle θL which is vertical relative to the bonding face of the semiconductor layer of the semiconductor laser chip 8 is wider than a parallel divergent angle θ// which is parallel to the bonding face. This semiconductor laser chip 8 is a semiconductor laser of so-called self-excitation type. If optical output of the emitted beam is raised, the parallel divergent angle θ// becomes narrower with an increase of this optical output. The semiconductor laser chip 8 is disposed such that its parallel divergent angle θ// is in parallel to a surface of the first semiconductor substrate 6.

This optical pickup device has a top face 2b and a bottom face 2c which are in parallel to each other. The optical pickup device contains a prism 2 in which one end portion is an oblique face 2a which serves as a beam branching face and is inclined relative to the bottom face 2c. This prism 2 is located over the respective signal reading optical detectors 11, 12, and 13. The prism 2 is disposed on the first semiconductor substrate 6 such that the bottom face 2c is joined to the top face of the first semiconductor substrate 6. The oblique face 2a is inclined at 45° with respect to the bottom face. On this oblique face 2a is formed polarization beam splitter (PBS) film 9 made of, for example, dielectric multilayer.

The prism 2 is formed of uniaxial crystal or biaxial crystal. As the uniaxial crystal, for example, LN ($LiNbO_3$) can be used. As the biaxial crystal, for example, KTP ($KTiOPO_4$) can be used. Further, as the uniaxial crystal, for example, $YVO_4$ can be used.

The uniaxial crystal is a crystal in which following relation is established if the refraction factors in three dimensional azimuths or the refraction factors in three refracting azimuths are assumed to be $n_x$, $n_y$, $n_z$:

$n_x=n_y<n_z$ or $n_x<n_y=n_z$

The biaxial crystal is a crystal in which the following relation is established:

$n_x<n_y<n_z$

If the material of crystal for forming the prism 2 is the uniaxial crystal, the optical axis (crystal axis) is set within a plane perpendicular to a normal line of the reflecting face (or top face or bottom face) in the prism 2. If the material of crystal for forming the prism 2 is the uniaxial crystal, an azimuth corresponding to a refraction factor having a difference larger from a middle refraction factor, of the crystal refraction azimuths is set within a plane perpendicular to a normal line of a reflecting face (or top face or bottom face) in the prism 2.

Beam emitted from the semiconductor laser chip 8 impinges upon the inclined face 2a of the prism 2. The beam from the semiconductor laser chip 8 impinges upon this inclined face 2a in the S polarization state. That is, the polarization beam splitter film 9 on the inclined face 2a reflects most of beam from the semiconductor laser chip 8, and allows most of the beam reflected by a magnetic optical disk 101 transmitted therethrough. The beam reflected by this polarization beam splitter film 9 is polarized in an azimuth perpendicular to the surface of the first semiconductor substrate 6, and emitted from this light reception/emission element.

Figure 21:
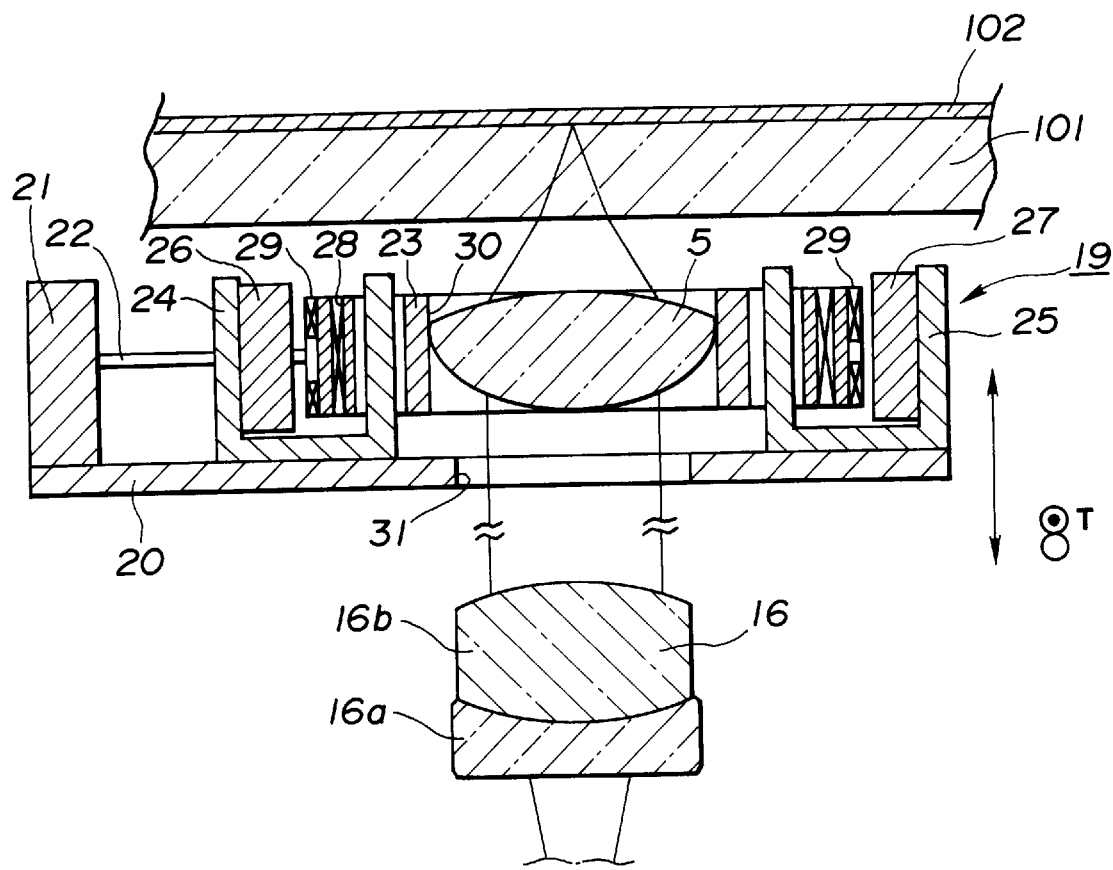
FIG. 21 is a longitudinal sectional view showing a structure of an objective lens driving mechanism for supporting an objective lens in a disk player apparatus according to the present invention.

Beam transmitted from the light reception/emission element 1 impinges upon the objective lens 5 as described above. The objective lens 5 is supported by an objective lens driving mechanism 19 which will be described later as shown in FIG. 21 (in FIG. 21, beam is changed to parallel beam by passing it through a collimator lens 16 before it impinges upon the objective lens 5). This objective lens driving mechanism 19 directs the objective lens 5 so as to face a signal recording surface of the magnetic optical disk 101. The objective lens 5 focuses incident beam upon the signal recording surface of the magnetic optical disk 101.

Then, the reflective beam which is reflected by the signal recording surface of the magnetic optical disk 101 contains photo-electromagnetic signal component in which a polarization face is turned due to so-called Kerr effect. This reflective beam passes the objective lens 5 and then impinges upon the polarization beam splitter film 9, so that it enters into the prism 2 through the inclined face 2a of the prism 2 and reaches the bottom face 2c of the prism 2.

If a transmission factor Tp relative to P polarization is selected so as to be larger than a transmission factor Ts relative to S polarization, the polarization beam splitter film 9 has so-called enhance function for photo-electromagnetic signals. Thus, the S/N ratio of the photo-electromagnetic signal is improved so that detection of more accurate photo-electromagnetic signals is enabled.

Figure 11:
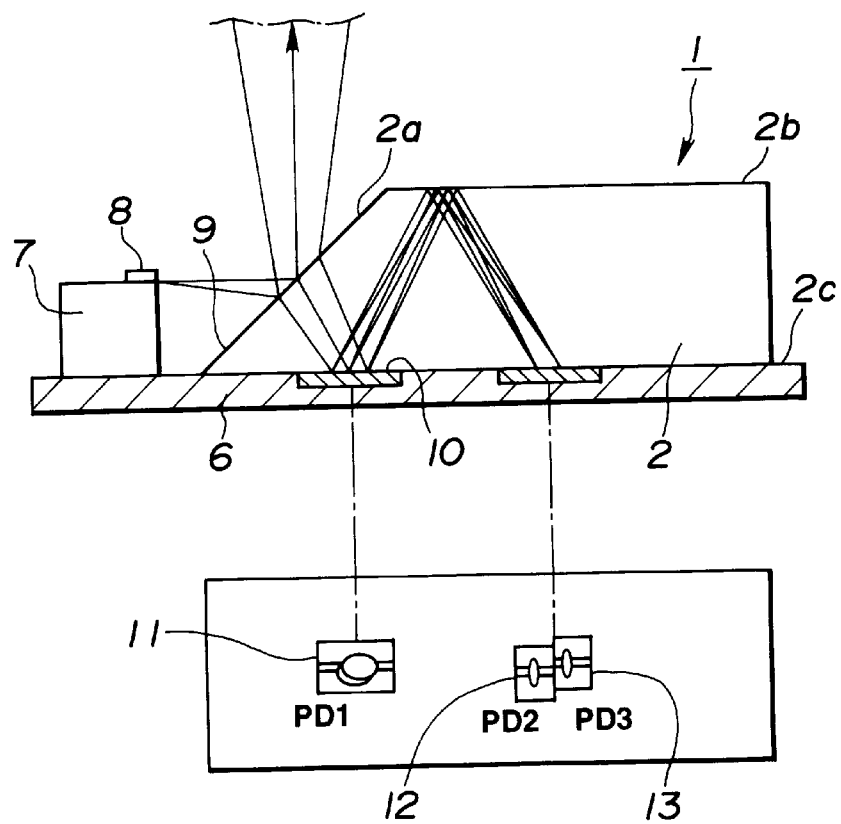
FIG. 11 shows a side view and a plan view of the light reception/emission element in the above optical pickup device.
Figure 12:
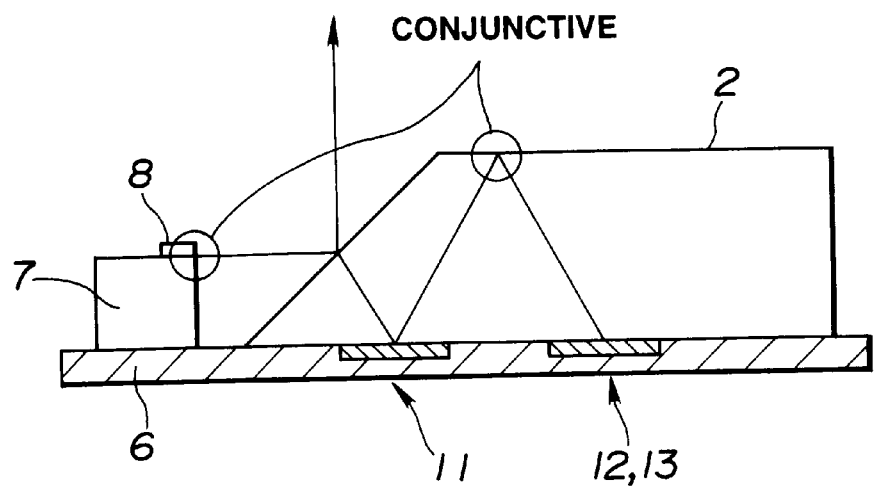
FIG. 12 is a side view showing a conjunctive relation between a light emission point and an optical detector in the above light reception/emission element.
Figure 13:
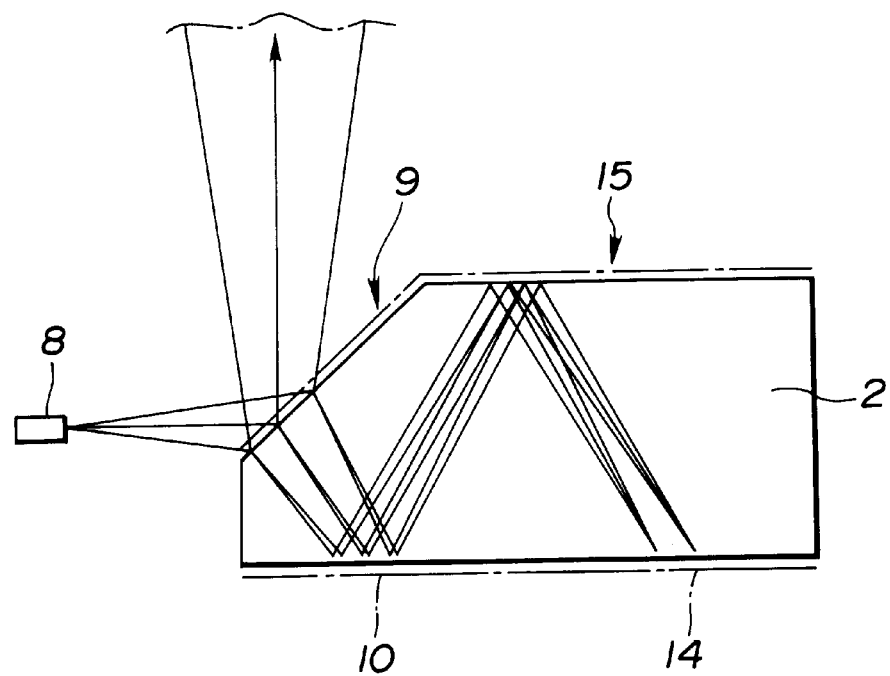
FIG. 13 is a side view showing a configuration of a prism in the above light reception/emission element.

In a region in which the reflective beam impinges, of the bottom face 2c of the prism 2, as shown in FIG. 13, semi-transmission film 10 is selectively formed (such that it does not overlap the second, third signal reading optical detectors 12, 13). On a top face of the first semiconductor substrate 6, located just below this region is formed a first signal reading optical detector 11, as shown in FIG. 11. A light spot α is formed on the light reception face of this first signal reading optical detector 11, by the reflective beam.

As shown in FIG. 13, a reflection preventive film or dielectric multilayer film 14 which will be described later is formed in a region in which the reflective beam is reflected by the semi-transmission film 10 and further reflected by the top face 2b of the prism 2 so as to reach the bottom face 2c of the prism 2, in order to enhance the transmission factor of the reflective beam. On a top face of the first semiconductor substrate 6, located just below this region are formed the second, third signal reading optical detectors 12, 13. A beam spot I is formed on the light reception face of the second signal reading optical detector 12, by the reflective beam. Further, a beam spot J is formed on the light reception face of the third signal reading optical detector, by the reflective beam.

The respective signal reading optical detectors 11, 12, 13 are disposed before or behind a position conjunctive (a position in which reflected beam by the top face 2a of the prism 2 is converged) with the semiconductor laser chip 8, which is a substantial light emission point.

In this case, because the prism 2 is composed of double refractive material, if the reflective beam impinges upon the prism 2, this reflective beam is separated to two beams, that is, ordinary ray (o-ray) or ordinary ray-like extraordinary ray and extraordinary ray (e-ray). Two reflective beams reflected by the top face 2b of the prism 2 reach the bottom face 2c thereof in separation state. Thus, the second and third signal reading optical detectors 12, 13 are disposed to receive these reflective beams.

Here, the "ordinary ray-like extraordinary ray" will be described. In the biaxial crystal such as KTP, any two refraction factors of refraction factors $n_x$, $n_y$, $n_z$ in three refraction azimuths are often similar values. Thus, if it is assumed that $n_x \approx n_y = n_0$, $n_z = n_0$ instead of $n_x \approx n_y < n_z$ in, for example, KTP, the biaxial crystal can be handled in the same manner as the uniaxial crystal. In this case, because $n_x \neq n_y$, a component corresponding to ordinary ray of the uniaxial crystal is slightly subjected to walk-off phenomenon. However, because this is near ordinary ray, it is called "ordinary ray-like extraordinary ray".

The reflective beam which impinges upon the first signal reading optical detector 11 is only slightly separated to two groups of rays because the first signal reading optical detector 11 is near the inclined face 2a. Thus, this beam can be handled as substantially one beam. The first signal reading optical detector 11 receives both the two groups of rays.

The beam reflected by the semi-transmission film 10 is reflected by the top face 2b of the prism 2, based on a difference between the refraction factor of the double refractive material composing the prism 2 and a refraction factor of the outside air. That is, if a material having a high refraction factor is utilized for the double refractive material composing the prism 2, the top face 2a of the prism 2 can be made to act so as to reflect fully. Thus, if a material having a high refraction factor is used as the double refractive material composing the prism 2, it is not necessary to provide the top face of the prism 2 with a full reflective film. However, if a material having a low refraction factor is used for the double refractive material, it is permissible to provide the top face of the prism 2 with a high reflective layer 15 to prevent a drop in light quantity of beam, as shown in FIG. 13. Although this high reflective layer 15 is composed of dielectric high reflective film having a refraction factor of about 98%, it is permitted to be composed of metallic film or metallic plate such as Al, Ag.

Here, the prism 2 is bonded to the bottom face 2c of the first semiconductor substrate 6. Generally, the refraction factor of adhesive is about 1.5 in near infrared ray range of 780 nm. Thus, if a difference in refraction factor between the double refractive material composing the prism 2 and adhesive is large, it is desirable to provide a reflection preventive film 14 between the prism 2 and the adhesive layer.

In the prism 2, a distribution in light quantity sometimes occurs in reflective beam which impinges, due to angular distribution of characteristics of the polarization beam splitter film 9, the semi-transmission film 10 and the like, distribution of natural polarization azimuth in crystal of double refractive material composing the prism 2, and other reason. Such a distribution in light quantity not only affect the photo-electromagnetic reproduction signal adversely but also affects servo signal adversely. Thus, to correct the above distribution in light quantity, it is permissible to provide the bottom face 2c of the prism 2 with dielectric multilayer film 14 having a difference in optical characteristic with respect to the P polarization and S polarization.

Figure 22:
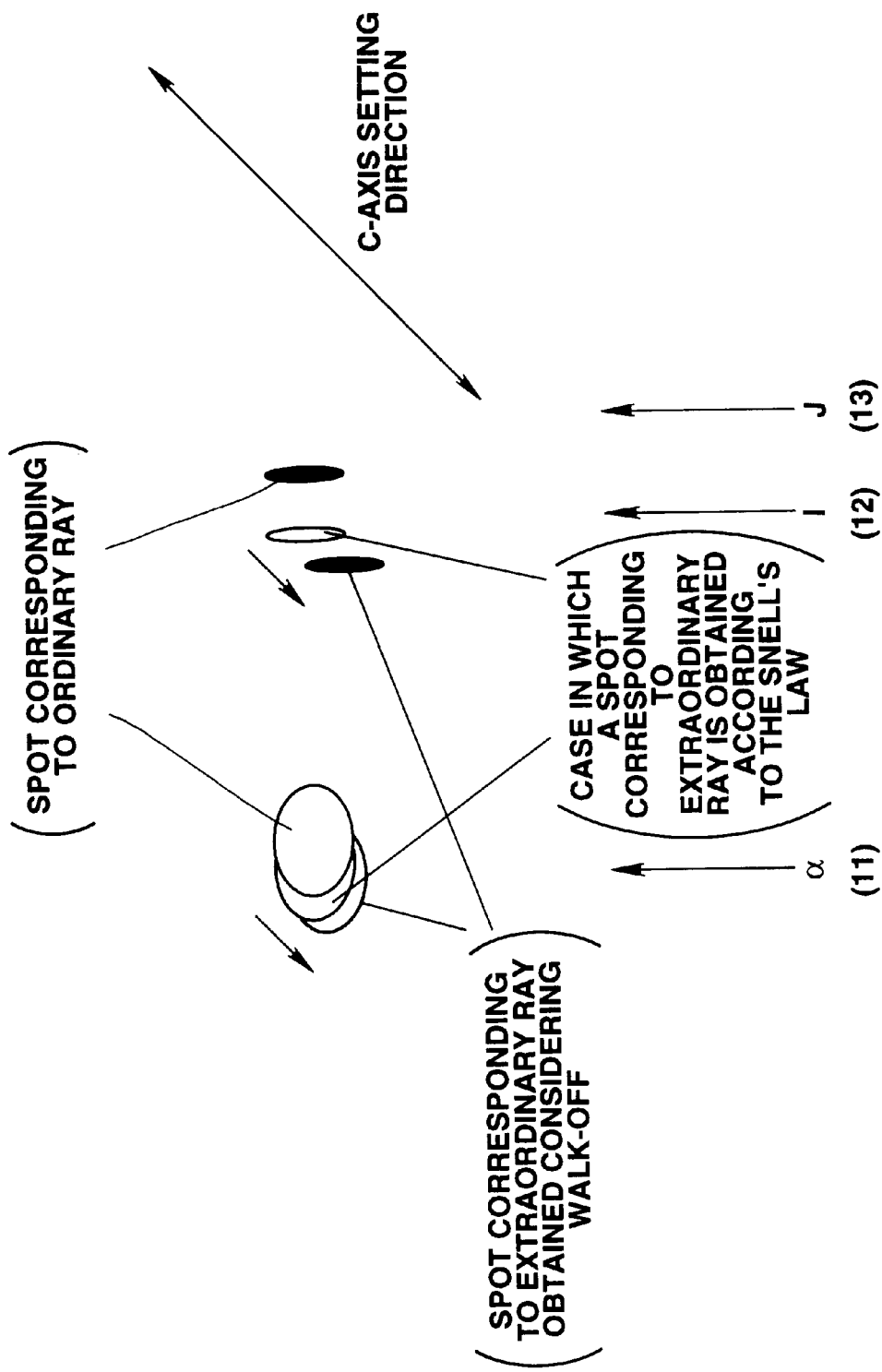
FIG. 22 is a plan view for explaining walk-off caused when the prism of the light reception/emission element according to the present invention is made of LN (LiNbO$_3$), using shapes of the spots.

With respect to the reflective beam progressing within the prism 2, its extraordinary ray component is subjected to walk-off phenomenon because this prism 2 is formed of crystal material having double refractive characteristic. This walk-off refers to such a phenomenon in which wave surface normal line direction (wave surface normal line vector k) based on the Snell's law is not coincident with beam direction (beam vector S) in which light energy makes a progress. As shown in FIG. 22, when the prism 2 is formed of LN (LiNbO$_3$) which is a uniaxial crystal, the spots α, I which are formed on the light reception faces of the first, second signal reading optical detectors 11, 12 by the extraordinary ray are formed at a position deviated in the same direction along the C-axis setting direction of the uniaxial crystal, with respect to a position determined according to the Snell's law. The spot α formed on the first signal reading optical detector is a spot in which two groups of ray overlap. The extraordinary ray component of this spot α is moved by the walk-off. The ordinary ray component is not subjected to the walk-off phenomenon. The ordinary ray components of the spots J, α formed on the light reception face of the third signal reading optical detector 13 by the ordinary ray are formed at a position determined by the Snell's law.

Figure 23:
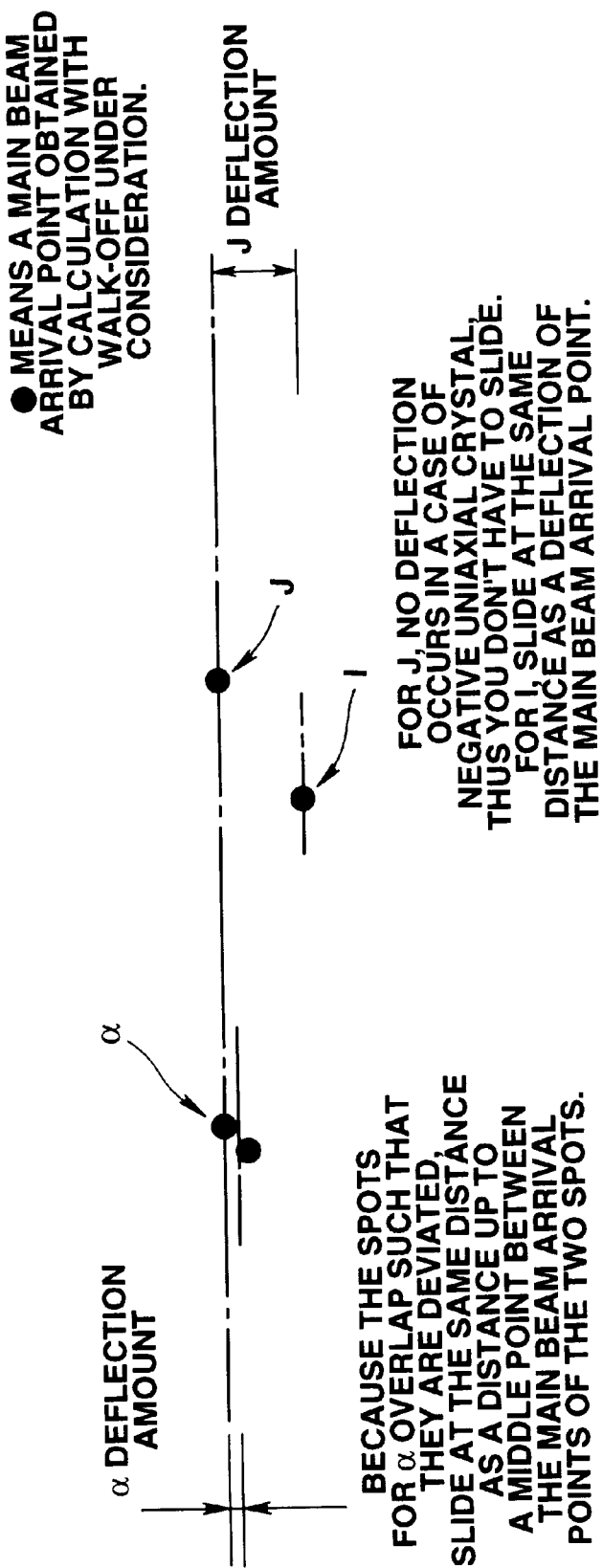
FIG. 23 is a plan view showing walk-off caused when the prism of the light reception/emission element according to the present invention is made of LN (LiNbO$_3$), relative to center points.

Thus, as shown in FIG. 23, the first, second signal reading optical detectors 11, 12 are formed at positions in which the center of the spots α, I each coincides with the center of the light reception faces.

Figure 24:
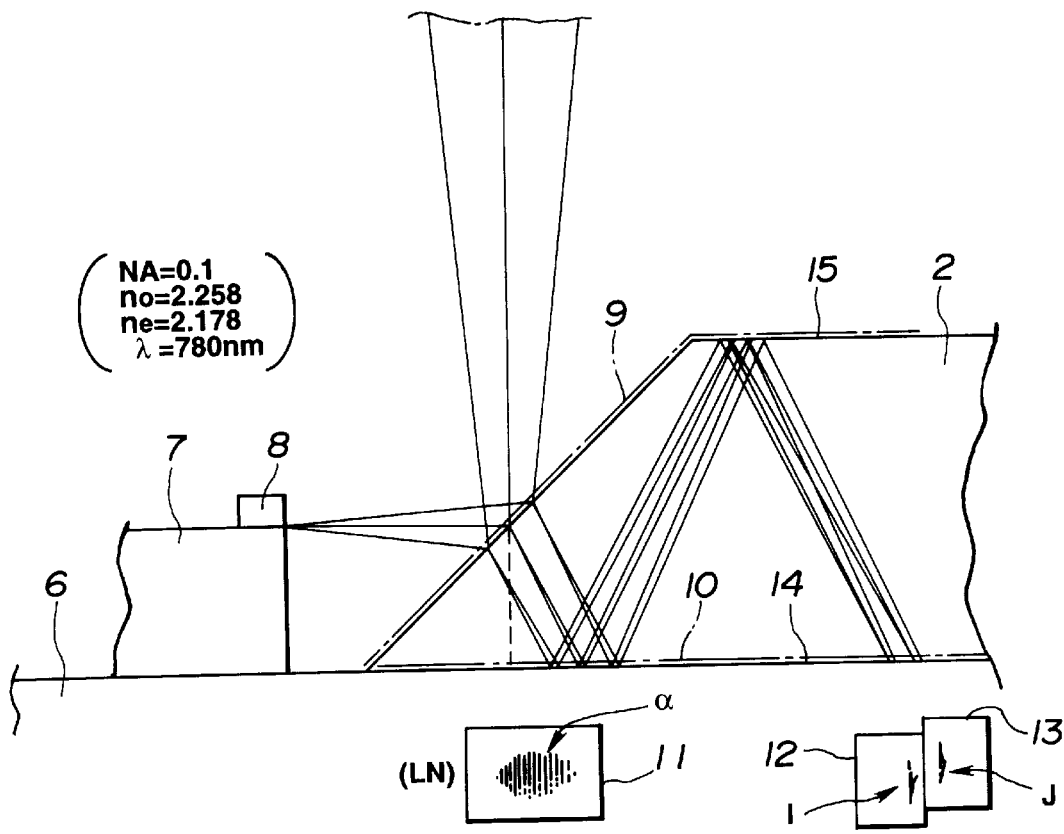
FIG. 24 shows a side view and a plan view showing optical paths in the prism and shapes of spots formed on the signal reading optical detectors, when the prism of the light reception/emission element according to the present invention is made of LN (LiNbO$_3$)

That is, when the beam emitted from the objective lens 5 is converged on the signal recording surface of the magnetic optical disk 101, the spots α, I, J of the reflective beam, formed on the light reception faces of the signal reading optical detectors 11, 12, 13 are formed substantially in the center of the light reception surfaces of the signal reading optical detectors 11, 12, 13 (the optical path shown in FIG. 24 is determined assuming that the refraction factor of the prism 2 is $n_0$=2.258, $n_e$=2.178, the numerical aperture of the convergent angle of impinging beam is NA=0.1 and wave length of the beam is λ=780 nm.

Figure 25:
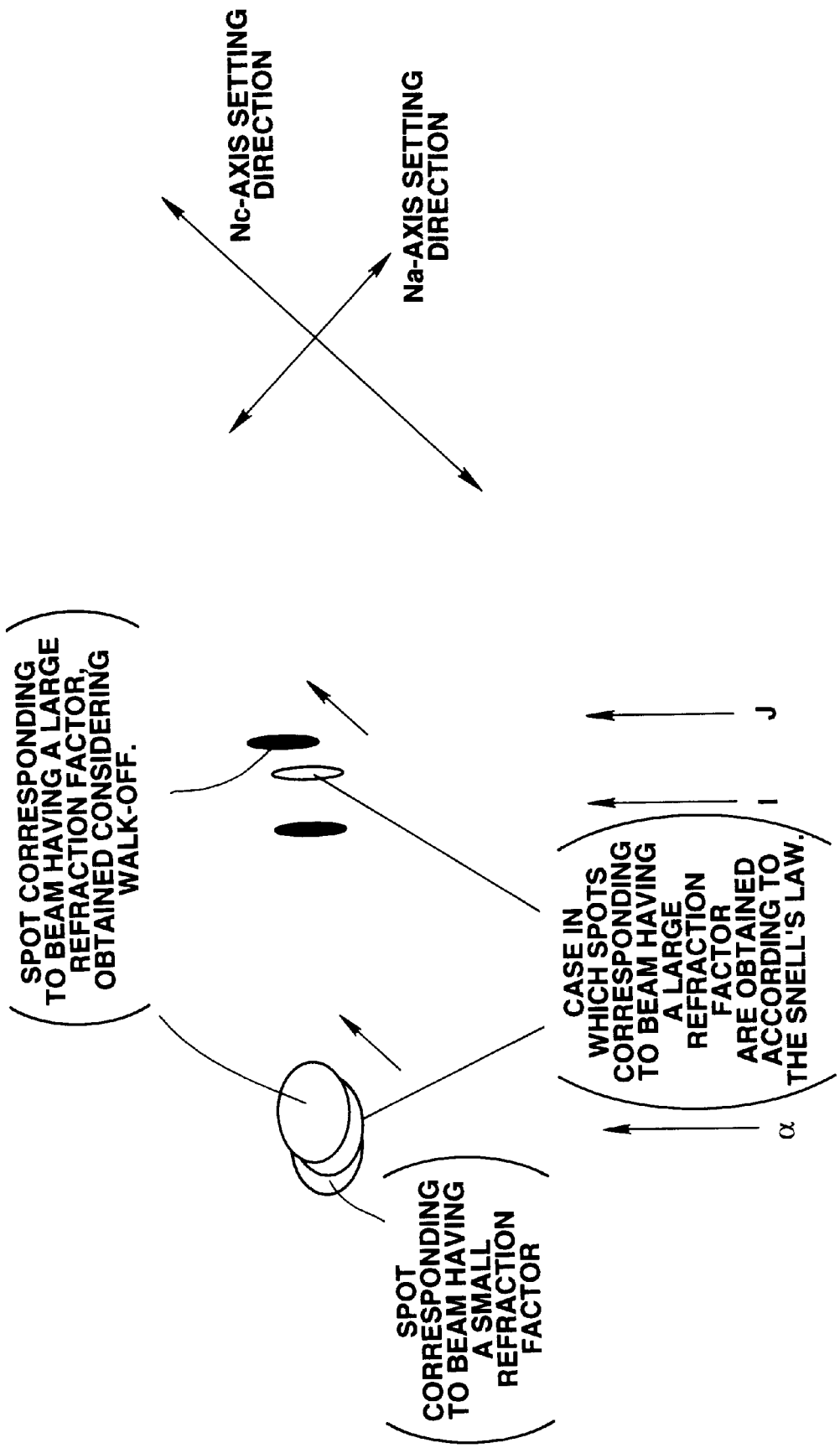
FIG. 25 is a plan view for explaining walk-off caused when the prism of the light reception/emission element according to the present invention is made of KTP (KTiOPO$_4$), using shapes of the spots.

When the prism 2 is formed of KTP (KTiOPO$_4$) which is a biaxial crystal, because this KTP has a characteristic similar to a positive uniaxial crystal, as shown in FIG. 25, the spots α, J formed on the light reception surfaces of the first and third signal reading optical detectors 11, 13 by extraordinary ray are formed at a position deviated in the same direction along the Nc axis setting direction of the biaxial crystal, with respect to positions determined according to the Snell's law. With respect to the spot α, only its extraordinary ray component is moved. The "ordinary ray-like extraordinary ray" is hardly subjected to the walk-off. The "ordinary ray-like extraordinary ray" component of the spots I, α formed on the light reception surfaces of the second signal reading optical detector 12 by the "ordinary ray-like extraordinary ray" is formed at a position determined in accordance with the Snell's law.

Figure 26:
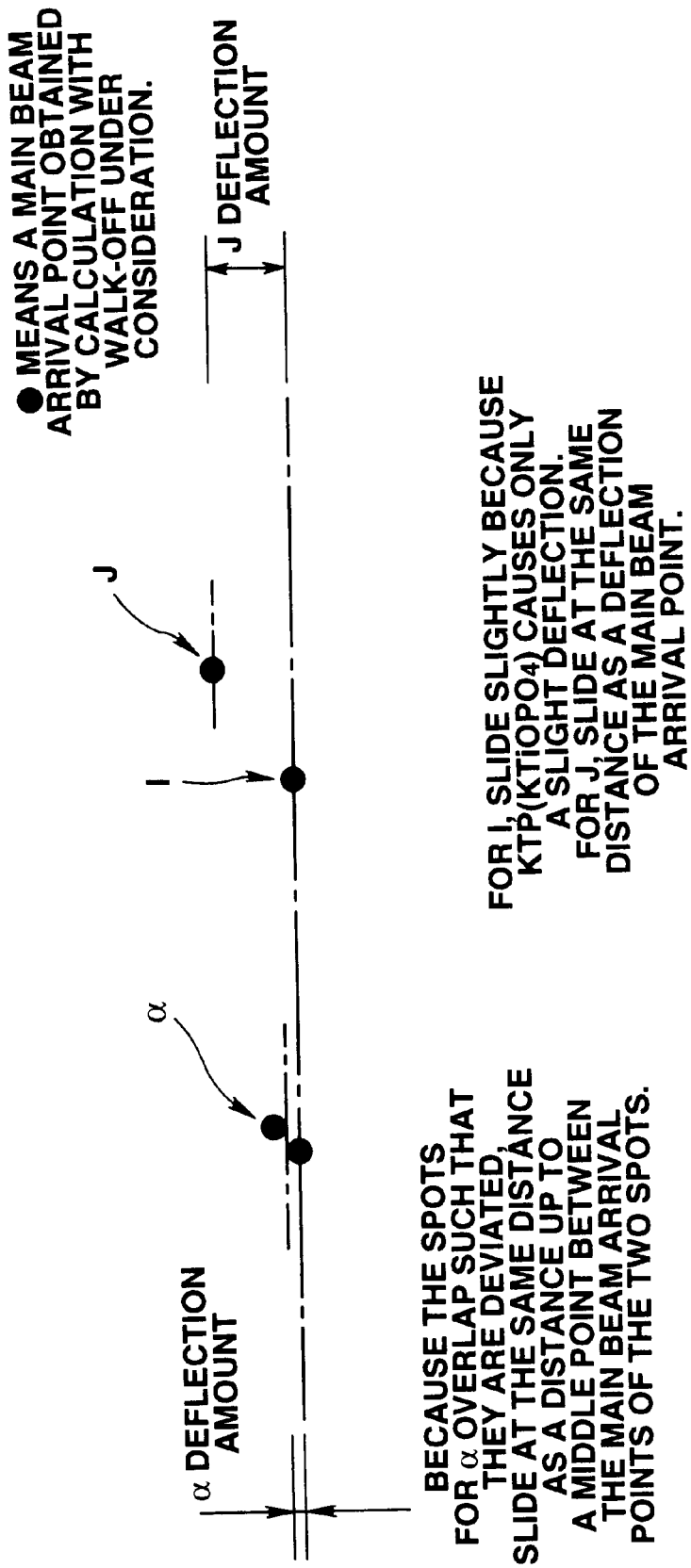
FIG. 26 is a plan view showing walk-off caused when the prism of the light reception/emission element according to the present invention is made of KTP (KTiOPO$_4$), relative to center points.
Figure 27:
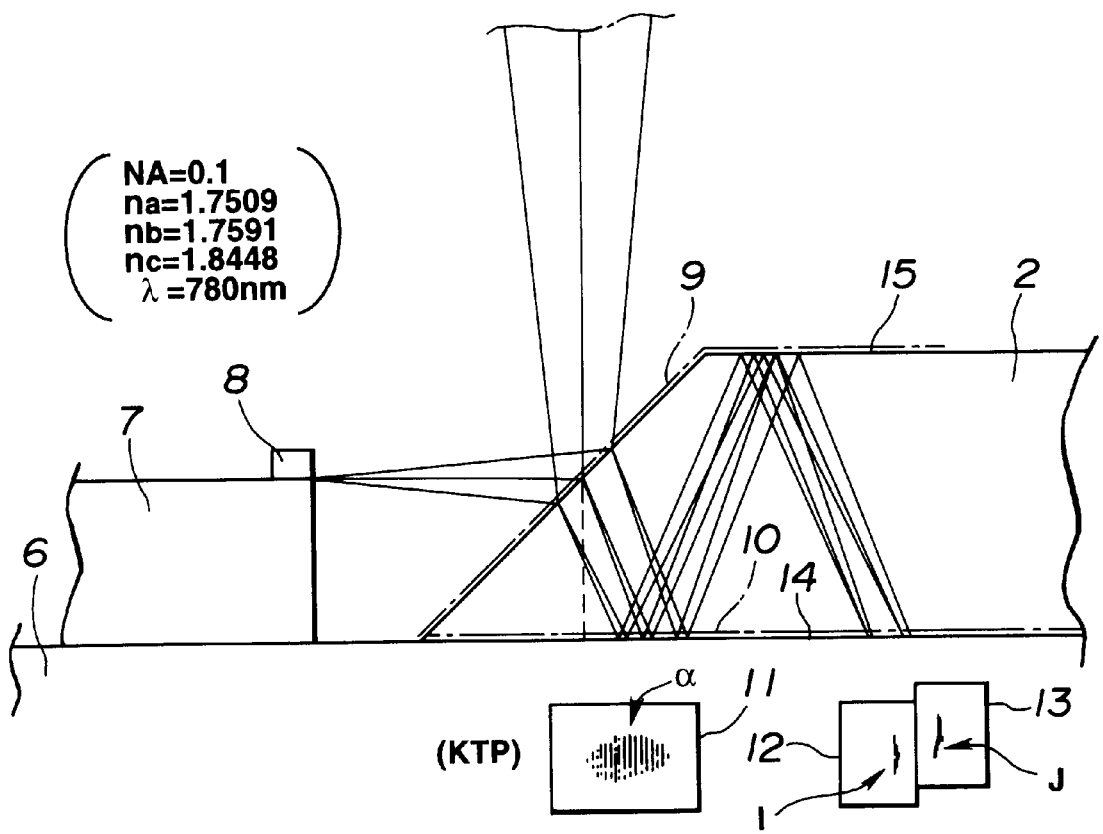
FIG. 27 shows a side view and a plan view showing optical paths in the prism and shapes of spots formed on the signal reading optical detectors, when the prism of the light reception/emission element according to the present invention is made of KTP (KTiOPO$_4$)

Thus, as shown in FIG. 26, the first, third signal reading optical detectors 11, 13 are formed at a position in which the center of the spots α, J each coincides with the center of the light reception surface. That is, when the beam is converged, the spots α, I, J of the reflective beam, formed on the light reception surface of the signal reading optical detectors 11, 12, 13 are formed substantially in the center of the light reception surface of the signal reading optical detectors 11, 12, 13 as shown in FIG. 27 (the optical path shown in FIG. 27 is determined assuming that the refraction factor of the prism 2 is $n_a$=1.7509, $n_b$=1.7591, $n_c$=1.8448, the numerical aperture of the convergent angle of impinging beam is NA=0.1 and wave length of the beam is λ=780 nm.)

Figure 28:
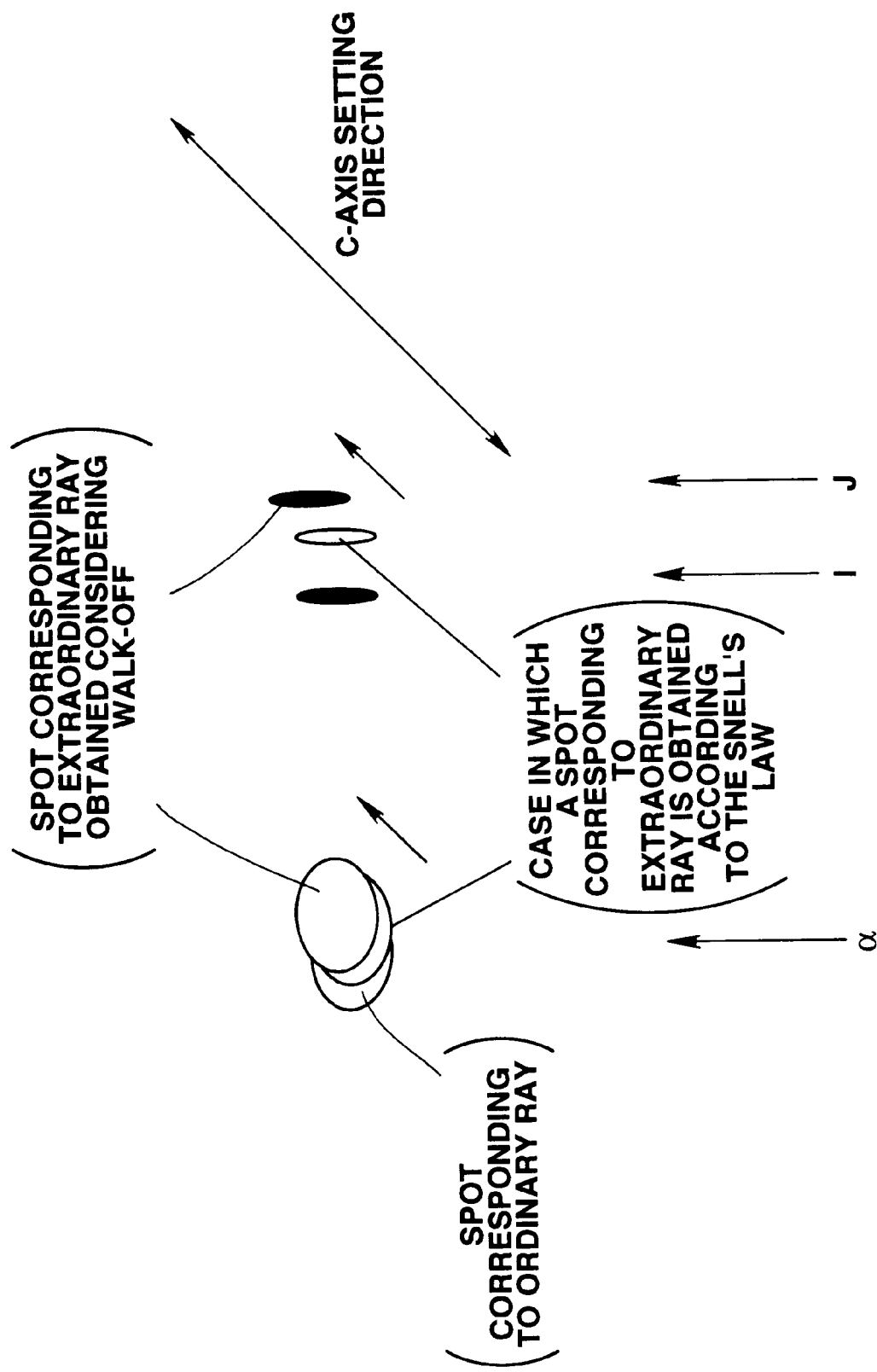
FIG. 28 is a plan view for explaining walk-off caused when the prism of the light reception/emission element according to the present invention is made of YVO$_4$, using shapes of the spots.

In a case when the prism 2 is formed of $YVO_4$ which is a uniaxial crystal, as shown in FIG. 28, the spots α, J formed on the light reception surface of the first, third signal reading optical detectors 11, 13, by the extraordinary ray are formed at a position deviated in the same direction along the C-axis setting direction of the uniaxial crystal, with respect to a position determined in accordance with the Snell's law. With respect to the spot α, only its extraordinary ray component is moved. Its ordinary ray is not subjected to walk-off. The ordinary ray components of the spots I, α, formed on the light reception surface of the second signal reading optical detector 12 by the ordinary ray are formed at a position determined in accordance with the Snell's law.

Figure 29:
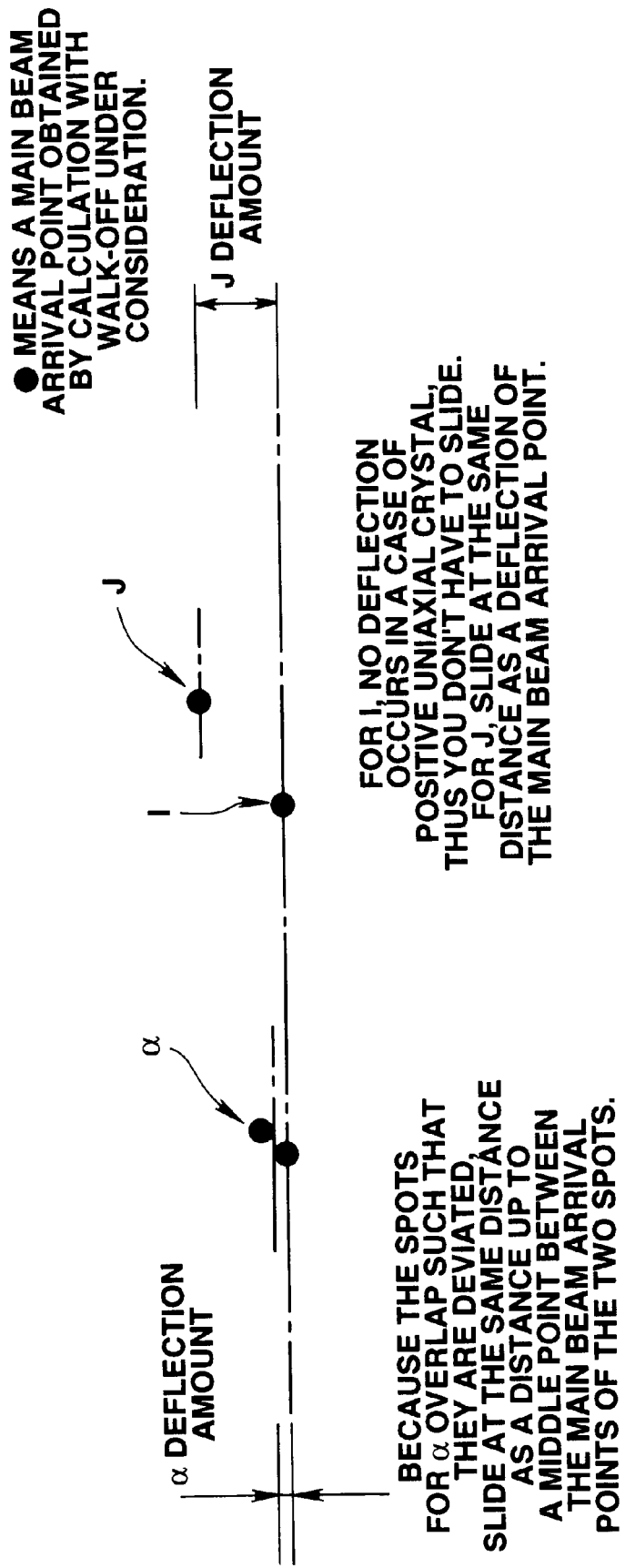
FIG. 29 is a plan view showing walk-off caused when the prism of the light reception/emission element according to the present invention is made of YVO$_4$, relative to center points.
Figure 30:
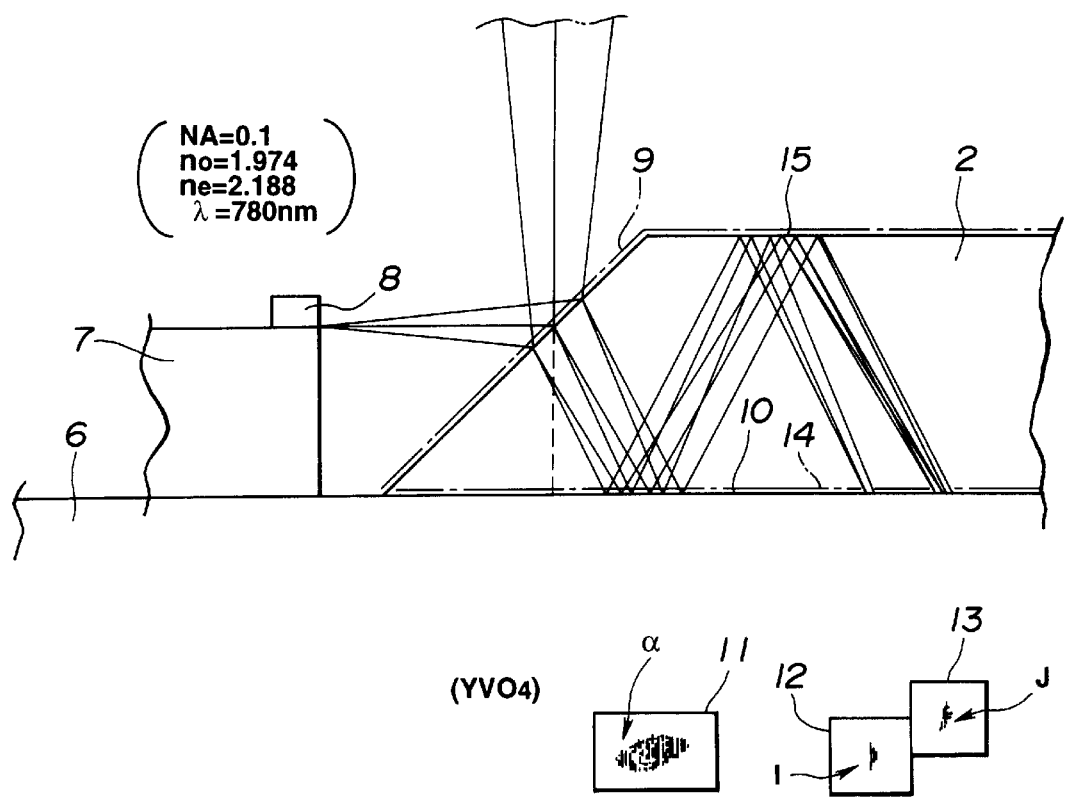
FIG. 30 shows a side view and a plan view showing optical paths in the prism and shapes of spots formed on the signal reading optical detectors, when the prism of the light reception/emission element according to the present invention is made of YVO$_4$.

Thus, as shown in FIG. 29, the first, third signal reading optical detectors 11, 13 are formed at a position in which the center of the spots α, J each coincides with the center of the light reception surface. That is, when the beam is converged, the spots α, I, J of the reflective beam, formed on the light reception surface of the signal reading optical detectors 11, 12, 13 are formed substantially in the center of the light reception surface of the signal reading optical detectors 11, 12, 13 as shown in FIG. 30 (the optical path shown in FIG. 30 is determined assuming that the refraction factor of the prism 2 is $n_0$=1.974, $n_e$=2.188, the numerical aperture of the convergent angle of impinging beam is NA=0.1 and wave length of the beam is λ=780 nm.)

Figure 14:
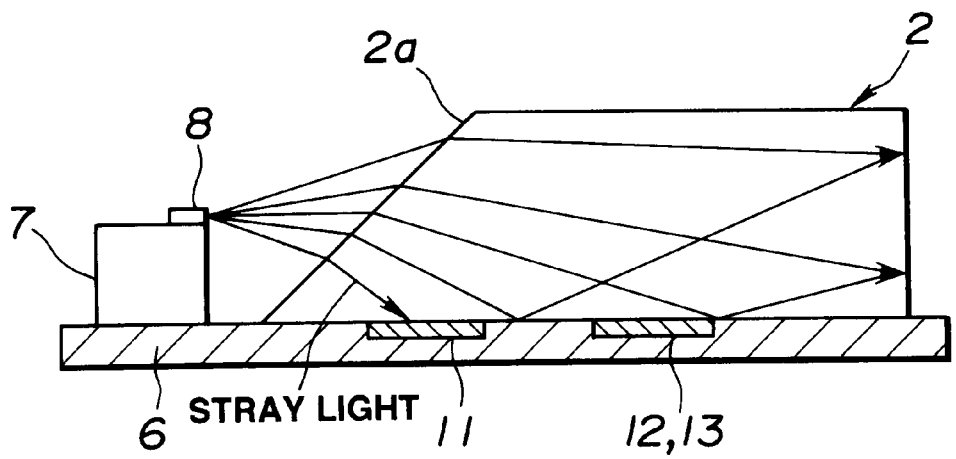
FIG. 14 is a side view showing stray light in the prism of the above light reception/emission element.
Figure 15:
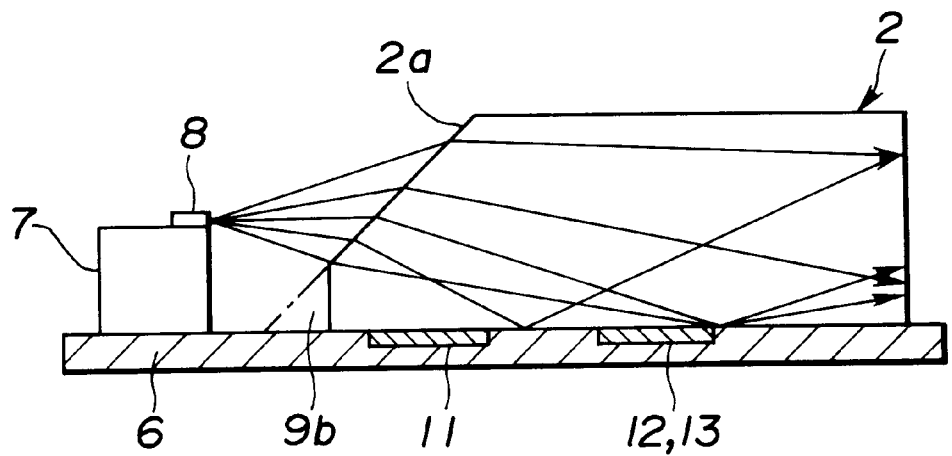
FIG. 15 is a side view showing stray light in a modification of the prism of the above light reception/emission element.

In the prism 2 shown in FIG. 11, the inclined face 2b extends from the top face 2b of the prism 2 to the bottom face 2c thereof. Thus, as shown in FIG. 14, part of beam from the semiconductor laser chip 8 sometimes passes through the polarization beam splitter film 9 formed on the inclined face 2a so that it directly impinges upon the first signal reading optical detector 11 as stray light. In this case, a detection signal detected by the first signal reading optical detector 11 is changed by this stray light. Thus, as shown in FIG. 15, a bottom side portion 9b unnecessary for the reflective beam from the magnetic optical disk 101 to impinge, of the inclined face 2a of the prism 2 is cut off, so that impingement of that stray light upon the first signal reading optical detector 11 is avoided.

Further, a light receiving portion which acts as an optical output detector (not shown) is formed backward of the prism 2 relative to the semiconductor laser chip 8, on the first semiconductor substrate 6. This optical output detector receives beam which is emitted by the semiconductor laser chip 8 and transmitted through the prism 2 so as to detect a light emission output of the semiconductor laser chip 8. The light emission output of the semiconductor laser chip 8 is controlled so as to be constant depending on the detection output outputted from the optical output detector (so-called front auto power control (FAPC)).

Figure 16:
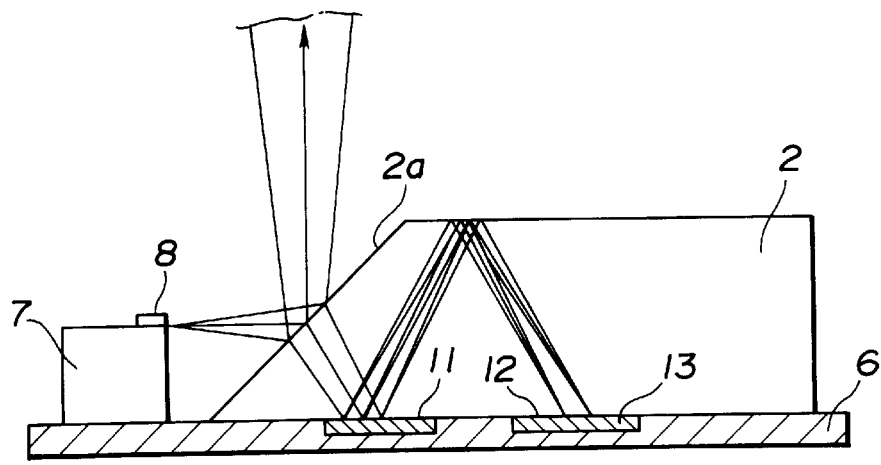
FIG. 16 is a side view showing a configuration of the above light reception/emission element.
Figure 17:
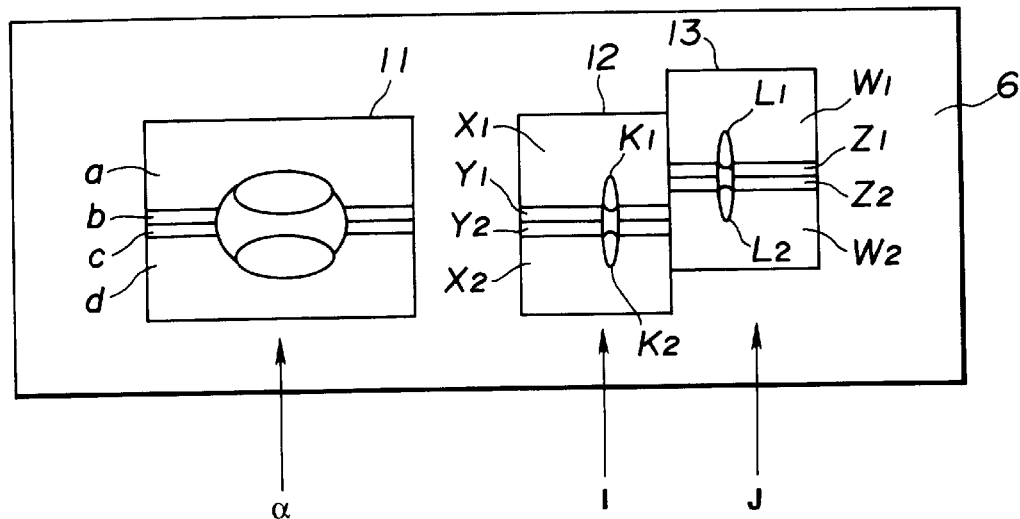
FIG. 17 is a plan view showing a configuration of the optical detectors of the above light reception/emission element.

The above signal reading optical detectors 11, 12, 13 are divided in the radius direction of the magnetic optical disk 101. As shown in FIGS. 16, 17, the first signal reading optical detector 11 are divided to a pair of division light receiving portions b, c which occupy the central portion of the first signal reading optical detector 11, and a pair of division light reception portions a, d located on both sides of the former portions b, c, by three parallel division lines, so that the division portions a, b, c, d are assured.

The second signal reading optical detector 12 is divided to a pair of division light reception portions $y_1$, $y_2$ which occupy the central portion of the second signal reading optical detector 12 and a pair of division light reception portions $x_1$, $x_2$ located on both sides of the former portions $y_1$, $Y_2$, by three parallel lines, so that four division light reception portions $x_1$, $y_1$, $Y_2$, $x_2$ are assured.

The third signal reading optical detector 13 is divided to a pair of division light reception portions $z_1$, $z_2$ which occupy the central portion of the third signal reading optical detector 13 and a pair of division light reception portions $w_1$, $w_2$ located on both sides of the former portions $z_1$, $z_2$, by three parallel lines, so that four division light reception portions $w_1$, $z_1$, $z_2$, $w_2$ are assured.

Detection signals Sa, Sb, Sc, Sd, $Sx_1$, $Sx_2$, $Sy_1$, $Sy_2$, $Sw_1$, $Sw_2$, $Sz_1$, $Sz_2$ from the respective division light reception portions a, b, c, d, and $x_1$, $Y_1$, $Y_2$, $x_2$, $w_1$, $z_1$, $z_2$, $w_2$ are current-voltage converted by each amplifier (not shown). Photo-electromagnetic reproduction signals MO•RF, bit reproduction signals (reading signal when so-called bit disk is reproduced), PIT•RF, focus error signal FCS and tracking error signal TRK are calculated in a manner described below by means of an operation circuit (not shown) formed on the first semiconductor substrate 6 of the light reception/emission element 1 or an operation circuit outside the light reception/emission element 1, connected to the respective division light reception portions, a, b, c, d, $x_1$, $Y_1$, $Y_2$, $X_2$, $w_1$, $z_1$, $z_2$, $w_2$.

Figure 18:
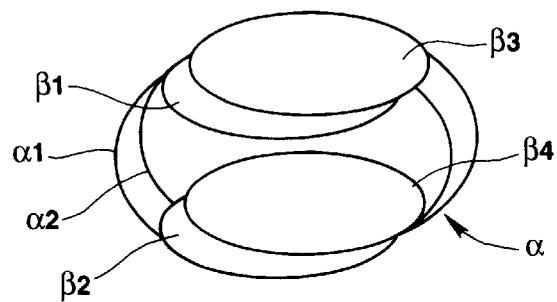
FIG. 18 is a plan view showing shapes of beam spots formed on a first signal reading optical detector in the above light reception/emission element.

Because the separation of the reflective beam impinging upon the first signal reading optical detector 11 to two groups is very slight, they can be handled as a single beam. That is, as shown in FIG. 18, the beam spot α formed by the reflective beam, on the first signal reading optical detector 11 is formed by overlapping of a beam spot $α_1$ formed by ordinary ray or "ordinary ray-like extraordinary ray" and a beam spot $α_2$ formed by extraordinary ray such that they are slightly deviated from each other. Regions having strong intensity distribution, $β_1$, $β_2$, $β_3$, $β_4$ (depending on the intensity balance of these regions, $β_1$, $β_2$, $β_3$, $β_4$, the tracking error signal which will be described later can be detected) are caused by an influence of diffraction which occurs on the recording track of the magnetic optical disk 101, on both side edges of the respective beam spots $α_1$, $α_2$.

The photo-electromagnetic reproduction signal MO•RF can be obtained from:

$$MO•RF=(Sx_1+Sx_2+Sy_1+Sy_2)-(Sw_1+Sw_2+Sz_1+Sz_2)$$

The bit reproduction signal PIT•RF can be obtained from:

$$PIT•RF=(Sa+Sb+Sc+Sd)+(Sx_1+Sx_2+Sy_1+Sy_2)+(Sw_1+Sw_2+Sz_1+Sz_2)$$

Meantime, the bit reproduction signal PIT•RF can be obtained from at least one of (Sa+Sb+Sc+Sd), ($Sx_1$+$Sx_2$+$Sy_1$+$Sy_2$) and ($Sw_1$+$Sw_2$ +$Sz_1$+$Sz_2$).

The focus error signal FCS can be obtained based on at least one of the detection signals (Sa, Sb, Sc, Sd), ($Sx_1$, $Sx_2$, $Sy_1$, $Sy_2$) and ($Sw_1$, $Sw_2$, $Sz_1$, $Sz_2$) obtained from the respective signal reading optical detectors 11, 12, 13. The tracking error signal TRK can be obtained by calculation of the detection signals of any one group of (Sa, Sb, Sc, Sd), ($Sx_1$, $Sx_2$, $Sy_1$, $Sy_2$) and ($Sw_1$, $Sw_2$, $Sz_1$, $Sz_2$).

Because the light reception sensitivities of the respective signal reading optical detectors 11, 12, 13 are low and other reason, in a system in which maintenance of CNR (Carrier-to-Noise-Ratio: CN ratio) for detection of the photo-electromagnetic reproduction signal MO•RF is severe, the CNR of the photo-electromagnetic reproduction signal MO•RF can be assured by using only the beam spot α which is received by the first signal reading optical detector 11 for detecting the tracking error signal TRK. That is:

$$TRK=(Sa+Sb)-(Sc+Sd)$$

In this case, the photo-electromagnetic medium may be a magnetic optical disk or a bit disk. If the magnetic optical disk 101 is a group disk having wobbles, removal of DC offset of the tracking error signal TRK is enabled by employing the wobble components $Sa_w$, $Sb_w$, $(Sa-Sb)_w$ and coefficient $K_w$ under:

$$TRK=[\{(Sa+Sb)-(Sc+Sd)\}/(Sa+Sb+Sc+Sd)]-K_w(Sa_w-Sd_w)/(Sa-Sd)_w$$

In a system in which a request for assuring a tracking error is severe, by utilizing the beam spot I which will be received by the second signal reading optical detector 12, the beam spot J which will be received by the third signal reading optical detector 13 or both the beam spots I, J for detection of the tracking error signal TRK, favorable tracking control is enabled in the group disk and bit disk. That is, $$TRK=(Sx_2+Sy_2)-(Sx_1+Sy_1)$$

$$TRK=(Sw_1+Sz_1)-(Sw_2+Sz_2)$$

$$TRK=\{(Sx_2+Sy_2)+(Sw_1+Sz_1)\}-\{(Sx_1+Sy_1)+(Sw_2+Sz_2)\}$$

The optical path of any one of the spots I, J is moved because it is largely affected by the walk-off phenomenon as described above. Thus, by utilizing the one less affected by the walk-off, of the spot I, J for detection of the tracking error signal TRK, it is possible to suppress asymmetry which may be caused by a move of field of view in the objective lens 5 due to an influence of the walk-off (the move of field of view in the objective lens 5 is caused by tracking servo motion which will be described later).

Further, by utilizing both the spots I, J for detection of the tracking error signal TRK, it is possible to reduce an influence of a change in the polarization component (change in light quantity ratio of two groups of beams) upon the tracking error signal TRK.

In a system which has a large defocus and is likely to be affected by a diameter of the beam spot on the signal recording surface, it is possible to reduce an influence of a change in the beam spot diameter on the signal recording surface, upon the tracking error signal TRK, by using the beam spots $\alpha$, I, or the beam spots $\alpha$, J or the beam spots $\alpha$, I, J for detection of the tracking error signal TRK. That is, $$TRK=\{(Sa+Sb)+K1(Sx_2+Sy_2)\}-\{(Sc+Sd)+K1(Sx_1+Sy_1)\}$$

$$TRK=\{(Sa+Sb)+K2(Sw_1+Sz_1)\}-\{(Sc+Sd)+K2(Sw_2+Sz_2)\}$$

$$TRK=\{(Sa+Sb)+K1(Sx_2+Sy_2)+K2(Sw_1+Sz_1)\}-\{(Sc+Sd)+K1(Sx_1+Sy_1)+K2(Sw_2+Sz_2)\}$$

Where the constants K1, K2 are determined depending on a ratio of the light quantity distributed by the semi-transmission film 10. That is, the constants K1, K2 are determined by a ratio (P$\alpha$/PI) between the intensity (P$\alpha$) of the reflective beam received by the first signal reading optical detector 11 and the intensity (PI, PJ) of the reflective beam received by the second or third signal reading optical detector 12, 13, or (P$\alpha$/PJ). That is, $$K1=P\alpha/PI=(Sb+Sc+Sa+Sd)/(Sy_1+Sy_2+Sx_1+Sx_2)$$

$$K2=P\alpha/PJ=(Sb+Sc+Sa+Sd)/(Sz_1+Sz_2+Sw_1+Sw_2)$$

In any case in which only the beam spot $\alpha$, the beam spot I, the beam spot J, the beam spots I, J, the beam spots $\alpha$, I, the beam spots $\alpha$, J or the beam spots $\alpha$, I, J are used for detection of the tracking error signal TRK, it is permissible to use the above described TPP (top hold push-pull) method. For example, $$TRK=\{K\cdot(Sa+Sb)_{top\ hold}-(Sa+Sb)\}-\{K\cdot(Sc+Sd)_{top\ hold}-(Sc+Sd)\}$$

Figure 1:
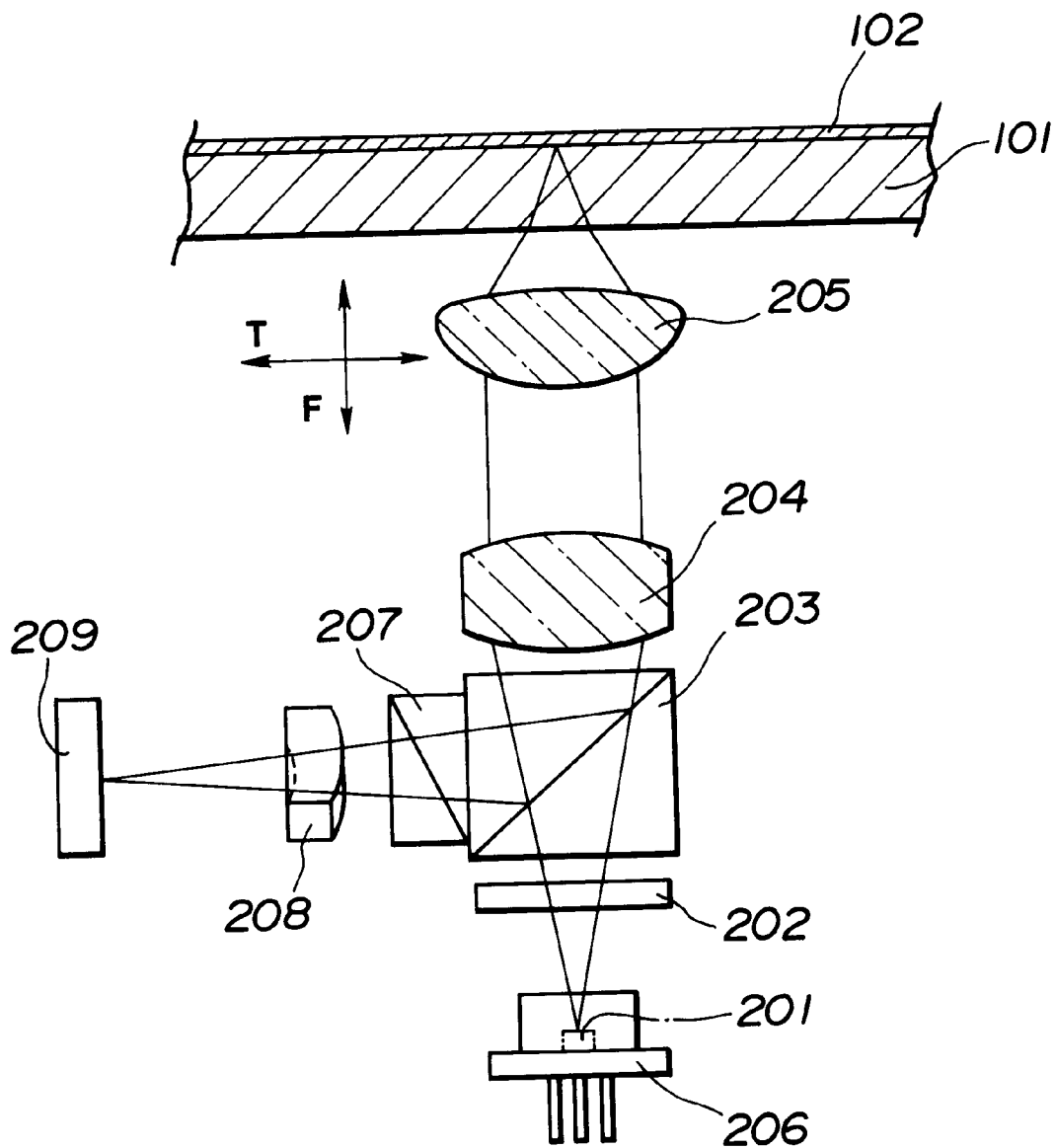
FIG. 1 is a side view showing a structure of an optical system of a conventional optical pickup device.
Figure 2:
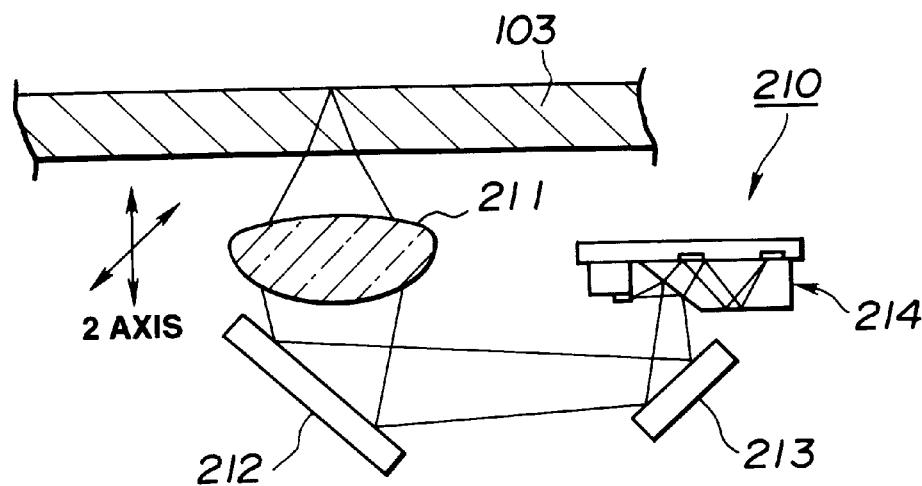
FIG. 2 is a side view showing a partly broken structure of the conventional optical pickup device utilizing a light reception/emission element.
Figure 3:
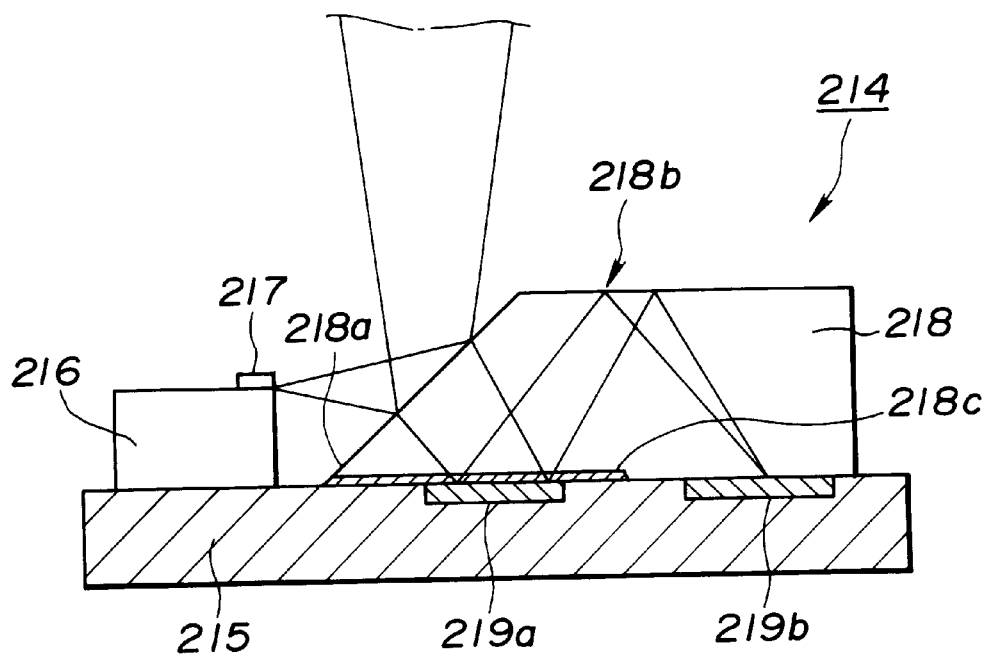
FIG. 3 is a side view showing a structure of the light reception/emission element of the above conventional optical pickup device.
Figure 4:
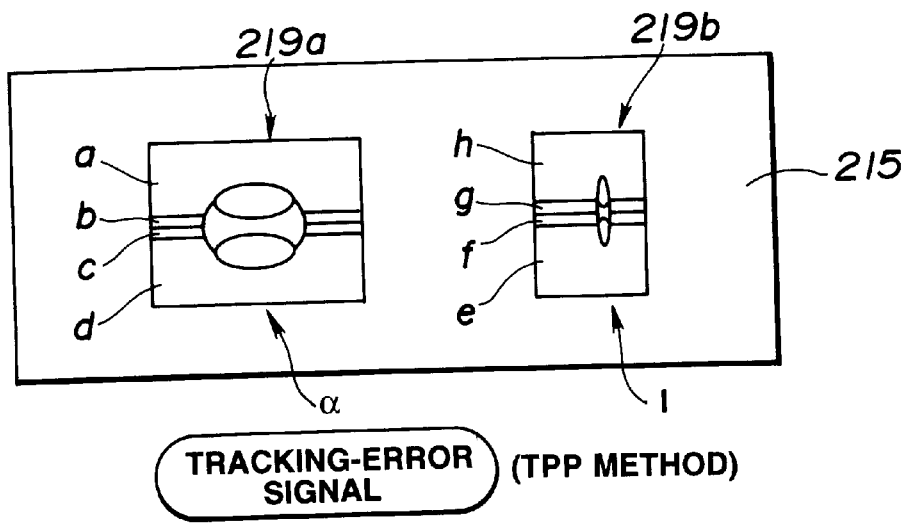
FIG. 4 is a plan view showing a structure of the light reception/emission element of the above conventional optical pickup device.
Figure 5:
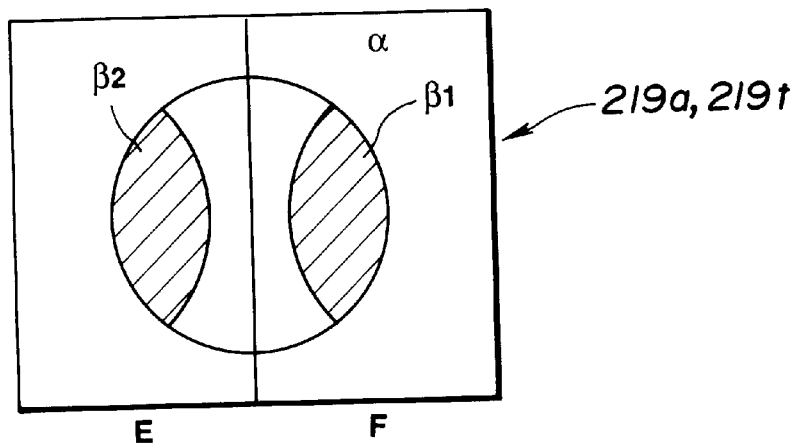
FIG. 5 is a plan view showing a shape of a spot of reflective beam formed on the light reception/emission element of the above conventional optical pickup device.
Figure 6:
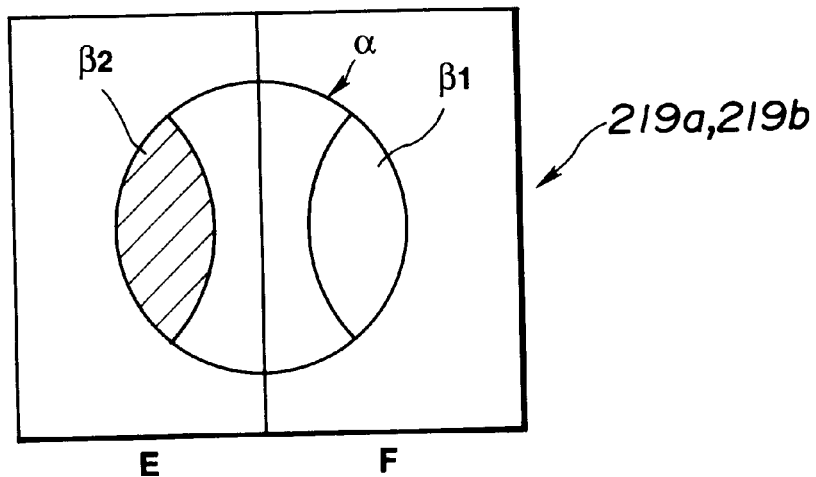
FIG. 6 is a plan view showing a shape of a spot formed when field of view is moved in a light reception/emission element of the above conventional optical pickup device.
Figure 7:
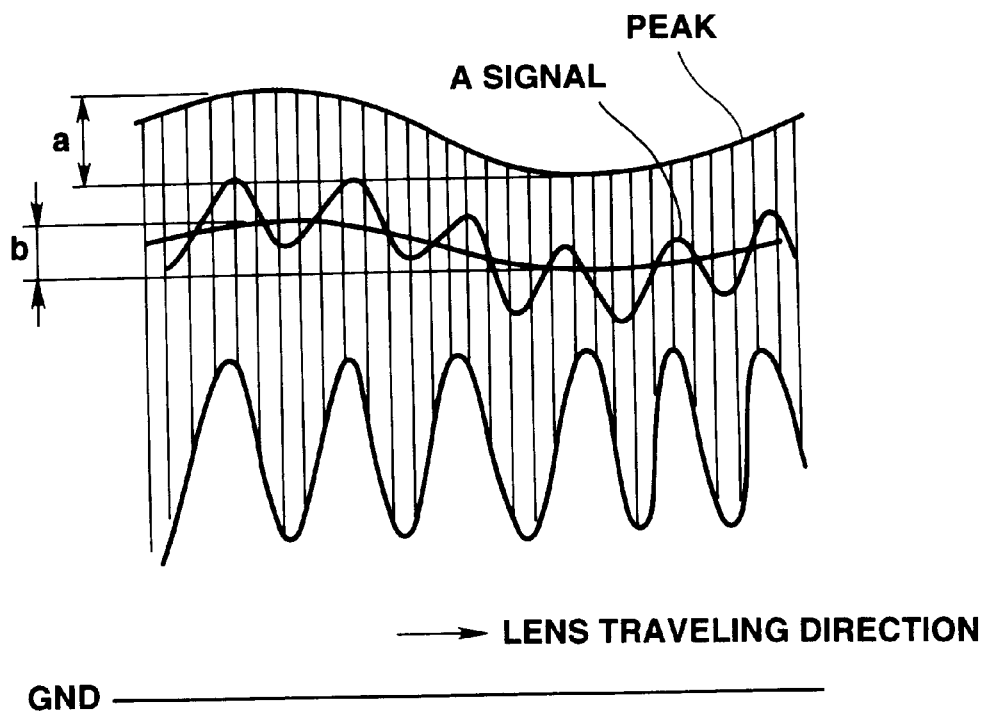
FIG. 7 is a diagram of waveform for explaining TPP method which is executed in the above conventional optical pickup device.
Figure 8:
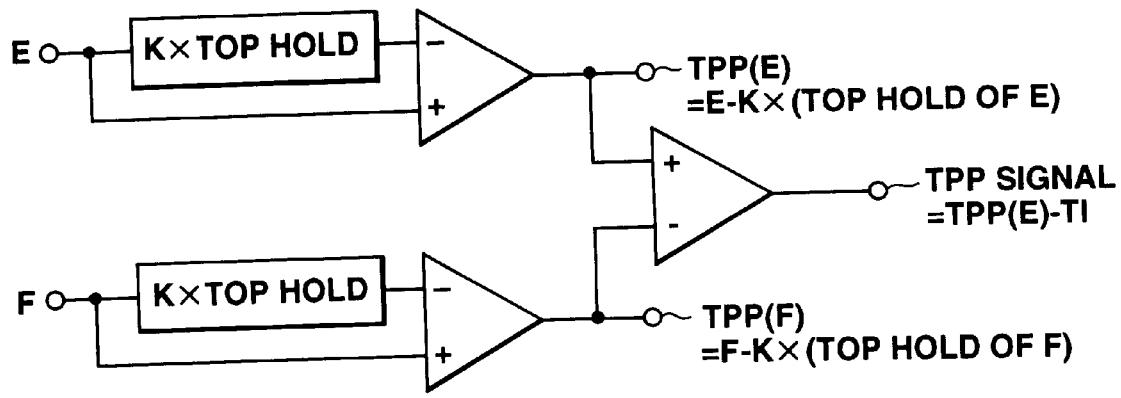
FIG. 8 is a block circuit diagram showing a configuration of an operation circuit for executing the TPP method in the above conventional optical pickup device.
Figure 9:
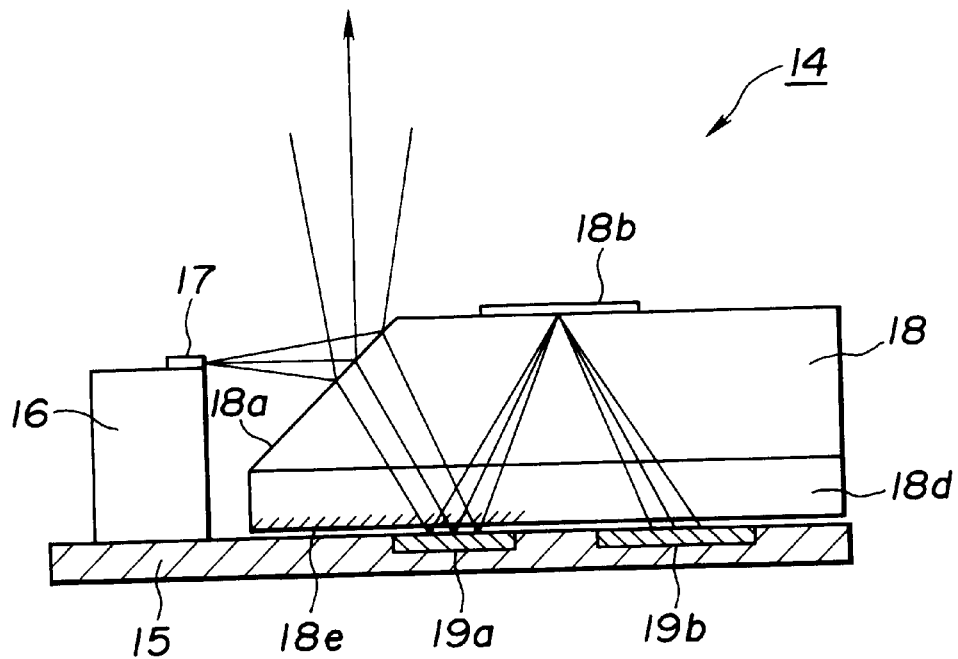
FIG. 9 is an enlarged longitudinal sectional view showing a modification of the light reception/emission element shown in FIG. 3.

The focus error signal FCS cannot be obtained by the same operation as in the case of the light reception/emission element 214 for CD shown in FIGS. 2–4, because the reflective beam reflected twice in the prism 2 is separated to two groups of beams. Thus, the focus error signal FCS is calculated as follows.

The shape of the spot formed by the reflective beam, on the respective signal reading optical detectors 11, 12, 13 changes depending on a difference between the focus point of the objective lens 5 and the signal recording surface of the magnetic optical disk 111. Because the separation of the reflective beam impinging upon the first signal reading optical detector 11 to two groups of beam is slight as shown in FIG. 18, the separated beams can be handled as a single beam. Thus, as shown in FIG. 17, the focus error signal FCS can be obtained as follows, in accordance with the detection signals Sa, Sb, Sc, Sd sent from the respective division light reception portions a, b, c, d of the first signal reading optical detector 11, and the detection signals Sx, Sy, Sw, Sz sent from the division light reception portions x, y, w, z of one of the second and third signal reading optical detectors 12, 13, when G is a positive constant.

$$FCS=G\cdot\{(Sb+Sc)-(Sa+Sd)\}-\{(Sy_1+Sy_2)-(Sx_1+Sx_2)\}$$

or $$FCS=G\cdot\{(Sb+Sc)-(Sa+Sd)\}-\{(Sz_1+Sz_2)-(Sw_1+Sw_2)\}$$

Where the constant G is determined depending on a ratio of light quantity distributed by the semi-transmission film 10. That is, the constant G is determined in accordance with a ratio (PI/P$\alpha$) between the intensity (P$\alpha$) of the reflective beam received by the first signal reading optical detector 11 and the intensity (PI, PJ) of the reflective beam received by the second or third signal reading optical detector 12, 13, or a ratio (PJ/P$\alpha$). That is, $$G=PI/P\alpha=(Sy_1+Sy_2+Sx_1+Sx_2)/(Sb+Sc+Sa+Sd)$$

or $$G=PJ/P\alpha=(Sz_1+Sz_2+Sw_1+Sw_2)/(Sb+Sc+Sa+Sd)$$

The focus error signal FCS is a signal indicating a distance between a focus point of the reflective beam emitted from the objective lens 5 and the signal recording surface, in a direction of the optical axis of the objective lens 5. In a disk player apparatus, the objective lens 5 is moved in the direction of the optical axis thereof as shown by the arrow F in FIG. 10, so that the focus error signal FCS becomes 0, that is, focus servo action is conducted. The tracking error signal TRK indicates a distance between a focus point of the beam emitted from the objective lens 5 and the recording track, in a direction perpendicular to the tangent line of the recording track and the optical axis of the objective lens 5, namely, in the radius direction of the magnetic optical disk 101. In the disk player apparatus, the objective lens 5 is moved in a direction perpendicular to the tangent line of the recording track and the optical axis of the objective lens 5, as shown by the arrow T in FIG. 10 until the tracking error signal TRK becomes 0, that is, tracking servo action is conducted.

Figure 19:
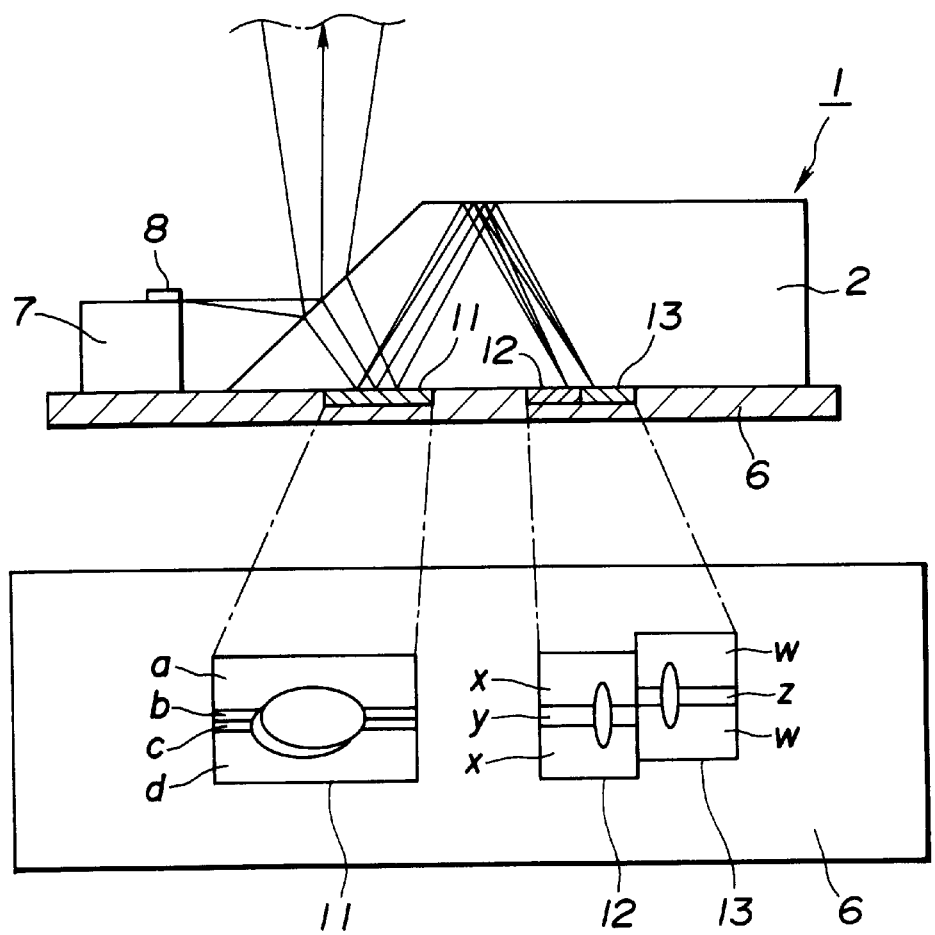
FIG. 19 shows a side view and a plan view showing a structure of optical detectors in a light reception/emission element according to a second embodiment of the present invention.
Figure 20:
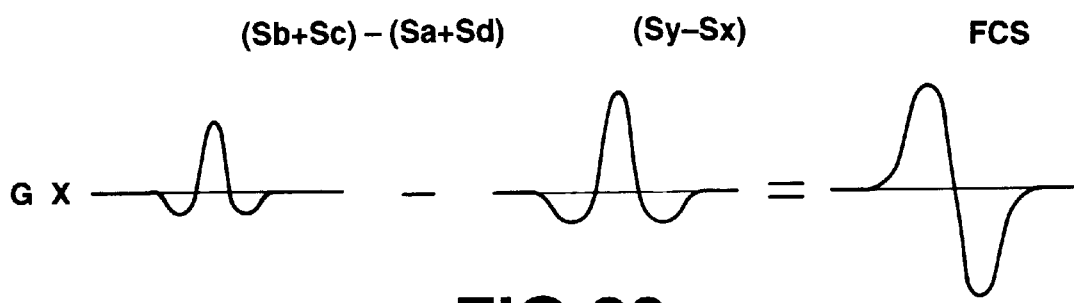
FIG. 20 is a signal waveform diagram showing a condition for detecting focus error in an optical pickup device employing the light reception/emission element according to the second embodiment.
Figure 31:
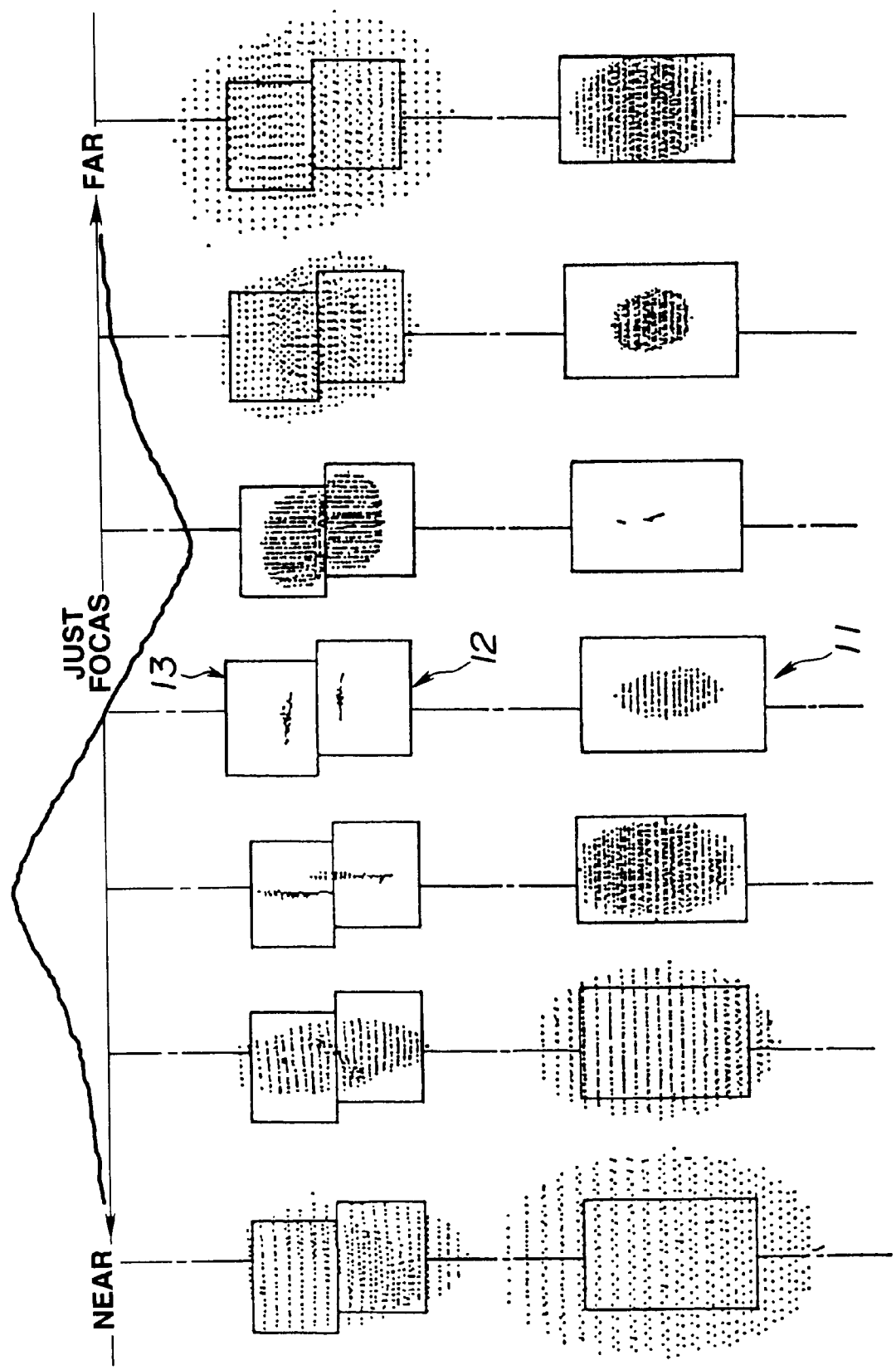
FIG. 31 is a plan view showing adjustment of the allocation of the signal reading optical detectors in the light reception/emission element according to the present invention.

Next, a second embodiment of the present invention is shown in FIGS. 19, 20 and 31. The composition of the other parts is the same as the above described embodiment. As shown in FIG. 19, the second signal reading optical detector 12 is divided to three division light reception portions by two parallel division lines, that is, a central portion y of the second signal reading optical detector 12, and a pair of the division portions x, x, located on both sides of the former portion y.

Further, a third signal reading optical detector 13 is divided to three division light reception portions by two parallel lines, that is, a central portion z of the third signal reading optical detector 13, and a pair of the division portions w, w, located on both sides of the former portion z.

Detection signals Sa, Sb, Sc, Sd, Sx (sum of the detection signals from the two division light reception portions x, x), Sy, Sw (sum of the detection signals from the two division light reception portions w, w), Sz from the respective division light reception portions a, b, c, d, and x, y, w, z are current-voltage converted by each amplifier (not shown). Photo-electromagnetic reproduction signals MO•RF, bit reproduction signals (reading signal when so-called bit disk is reproduced), PIT•RF, focus error signal FCS and tracking error signal TRK are calculated in a manner described below by means of an operation circuit (not shown) formed on the first semiconductor substrate 6 of the light reception/emission element 1 or an operation circuit outside the light reception/emission element 1, connected to the respective division light reception portions, a, b, c, d, x, y, w, z.

That is, the photo-electromagnetic reproduction signal MO•RF can be obtained from:

$MO\bullet RF=(Sx+Sy)-(Sw+Sz)$

The bit reproduction signal PIT•RF can be obtained from:

$PIT\bullet RF=(Sa+Sb+Sc+Sd)+(Sx+Sy)+(Sw+Sz)$

Meantime, the bit reproduction signal PIT•RF can be obtained from at least one of (Sa+Sb+Sc+Sd), (Sx+Sy) and (Sw+Sz).

The focus error signal FCS can be obtained based on at least one of the detection signals (Sa, Sb, Sc, Sd), (Sx, Sy) and (Sw+Sz) obtained from the respective signal reading optical detectors 11, 12, 13. The tracking error signal TRK can be obtained by calculation of the detection signals of any one group of (Sa, Sb, Sc, Sd), (Sx, Sy) and (Sw, Sz).

The focus error signal FCS is calculated as follows, because the reflective beam reflected twice in the prism 2 is separated to two groups of beams.

The shape of the spot formed by the reflective beam, on the respective signal reading optical detectors 11, 12, 13 changes depending on a difference between the focus point of the objective lens 5 and the signal recording surface of the magnetic optical disk 111. Because the separation of the reflective beam impinging upon the first signal reading optical detector 11 to two groups of beam is slight as shown in FIG. 31, the separated beams can be handled as a single beam. Thus, the focus error signal FCS can be obtained in the following formula, as shown in FIG. 20, in accordance with the detection signals Sa, Sb, Sc, Sd sent from the respective division light reception portions a, b, c, d of the first signal reading optical detector 11, and the detection signals Sx, Sy, Sw, Sz sent from the division light reception portions x, y, w, z of one of the second and third signal reading optical detectors 12, 13 as shown in FIG. 19, when G is a positive constant.

$FCS=G\cdot\{(Sb+Sc)-(Sa+Sd)\}-(Sy-Sx)$ or $FCS=G\cdot\{(Sb+Sc)-(Sa+Sd)\}-(Sz-Sw)$ Where the constant G is determined depending on a ratio of light quantity distributed by the semi-transmission film 10. That is, the constant G is determined in accordance with a ratio (PI/Pα) between the intensity (Pα) of the reflective beam received by the first signal reading optical detector 11 and the intensity (PI) of the reflective beam received by the second signal reading optical detector 12. That is, $G=PI/P\alpha=(Sy+Sx)/(Sb+Sc+Sa+Sd)$ The focus error signal FCS is a signal indicating a distance between a focus point of the reflective beam emitted from the objective lens 5 and the signal recording surface, in a direction of the optical axis of the objective lens 5. In a disk player apparatus, the objective lens 5 is moved in the direction of the optical axis thereof as shown by the arrow F in FIG. 10, so that the focus error signal FCS becomes 0, that is, focus servo action is conducted. The tracking error signal TRK indicates a distance between a focus point of the beam emitted from the objective lens 5 and the recording track, in a direction perpendicular to the tangent line of the recording track and the optical axis of the objective lens 5, namely, in the radius direction of the magnetic optical disk 101. In the disk player apparatus, the objective lens 5 is moved in a direction perpendicular to the tangent line of the recording track and the optical axis of the objective lens 5, as shown by the arrow T in FIG. 10, until the tracking error signal TRK becomes 0, that is, tracking servo action is conducted.

As described, favorable focus servo control can be conducted by disposing the respective signal reading optical detectors which reads the signal depending on a deviation of the spot corresponding to the walk-off of returned beam. Further, by fine-adjusting the positions of the signal reading optical detectors 11, 12, 13, the focus servo characteristic can be improved.

As shown in FIG. 32, phantom center lines of the second and third signal reading optical detectors 12, 13 are moved by a distance corresponding to a deviation between a main beam arrival point, at which the ordinary ray and extraordinary ray impinging upon the first signal reading optical detector 11 arrive and the phantom center line of the fist signal reading optical detector 11, with respect to each main ray arrival point, in a direction opposite to the direction of the deviation of the first center line.

According to FIG. 32A, the center line (broken lines) of the first signal reading optical detector 11 is deviated from one main ray arrival point by a predetermined distance to the leftward. Correspondingly, the center line (broken lines) of the second signal reading optical detector 12 is deviated from the main ray arrival point by a predetermined distance to the rightward.

Referring to FIG. 32B, the center line (broken lines) of the first signal reading optical detector 11 is deviated by a predetermined distance to the rightward with respect to the other main ray arrival point. Correspondingly, the center line (broken lines) of the third signal reading optical detector 13 is deviated by a predetermined distance to the leftward with respect to the main ray arrival point.

Figure 32C:
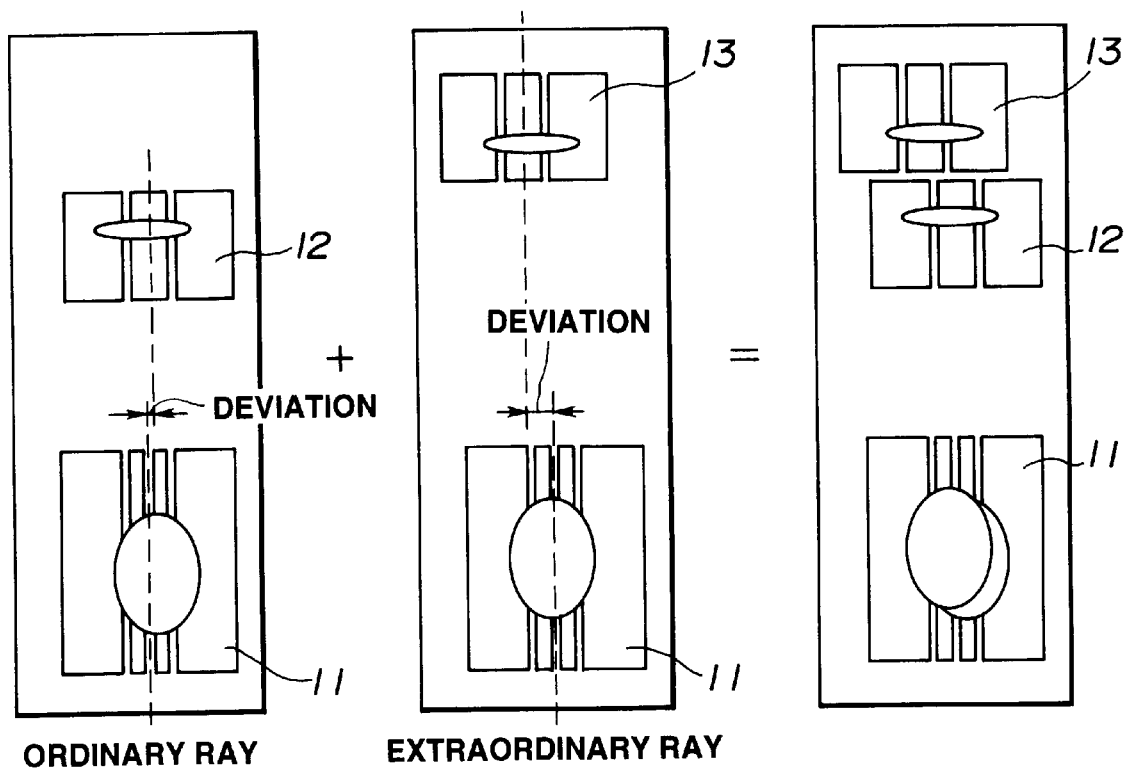
FIG. 32 is a plan view showing configurations of the light reception/emission elements according to the present invention, contained in a transparent case.

FIG. 32C shows a case in which the respective signal reading optical detectors shown in FIGS. 32A, 32B are disposed in combination. By the above arrangement, the quantity of defocus when the field of view of the objective lens is moved is reduced.

The disk player apparatus according to the present invention includes a rotating mechanism for supporting and rotating the magnetic optical disk 101, the optical pickup device pertinent to the present invention, the objective lens 5, an objective lens driving mechanism for supporting the objective lens 5 and a control means.

The rotating mechanism includes a spindle motor and a disk table mounted to a driving shaft of the spindle motor. This disk table is structured so as to support the central portion of the magnetic optical disk 101. The spindle motor rotates the magnetic optical disk 101 supported by the disk table as well as the disk table. In this disk player apparatus, the optical pickup device is supported so as to oppose the signal recording surface of the magnetic optical disk 101 supported by the disk table, through the objective lens 5. The optical pickup device is movable over from the internal circumference to the external circumference of the magnetic optical disk 101 in a direction of approaching or leaving the spindle motor.

The control means controls light emission output of the semiconductor laser chip 8 in accordance with optical detection output sent from the optical output detector of the optical pickup device. That is, in this disk player apparatus, the light emission output of the semiconductor laser chip 8 is controlled depending on the optical detection output sent by the optical output detector, so that the quantity of light irradiated to the signal recording surface of the magnetic optical disk 101 is accurately controlled.

In the disk player apparatus, focus servo action and tracking servo action are conducted by an objective lens driving mechanism (biaxial actuator) 19 which supports the objective lens 5 movably as shown in FIG. 21. This objective lens driving mechanism 19 contains an actuator base 20. The actuator base 20 is formed in a substantially flat plate and disposed over the light reception/emission element 1. At an end of the actuator base 20 is provided a supporting wall portion 21. A proximal end of an elastic supporting member 22 is fixed to the supporting wall portion 21. This elastic supporting member 22 is leaf-spring like member made of metallic material or synthetic resin material. A tip thereof is movable by elastic displacement. A lens holder 23 is fitted to an end of the elastic supporting member 22.

The lens holder 23 is movable by displacement of the elastic supporting member 22. The lens holder 23 holds the objective lens 5 such that double surfaces thereof face outward. A portion of the actuator base 20, which opposes the objective lens 5 has a hole 31 for beam impinging upon the objective lens 5 to pass through.

The lens holder 23 contains focus coil 28 and tracking coil 29. A pair of yokes 24, 25 on which magnets 26, 27 are attached are provided so as to rise opposing the focus coil 28 and the tracking coil 29. The magnets 26, 27 and the yokes 24, 25 position the respective coils 28, 29 in magnetic field generated.

In the objective lens driving mechanism 19, if focus driving current is supplied to the focus coil 28, the focus coil 28 receives a force from the magnetic field generated by the magnets 26, 27, so that the lens holder 23 is moved in the direction of the optical axis of the objective lens 5 or in the direction for converging as indicated by the arrow F in FIG. 21. By supplying focus driving current in accordance with the focus error signal FCS, the focus servo action is conducted. In the objective lens driving mechanism 19, if tracking driving current is supplied to the tracking coil 29, the tracking coil 29 receives a force from the magnetic field generated by the magnets 26, 27, so that the lens holder 23 is moved in a direction perpendicular to the optical axis of the objective lens 5 as indicated by the arrow T in FIG. 21. By supplying tracking driving current in accordance with the tracking error signal TRK, the tracking servo action is conducted. The tracking direction is a direction at parallel divergent angle $\theta//$ of the semiconductor laser chip 8, in order to reduce the diameter of a beam spot formed by convergent beams on the magnetic optical disk 101, along the recording track.

Figure 33:
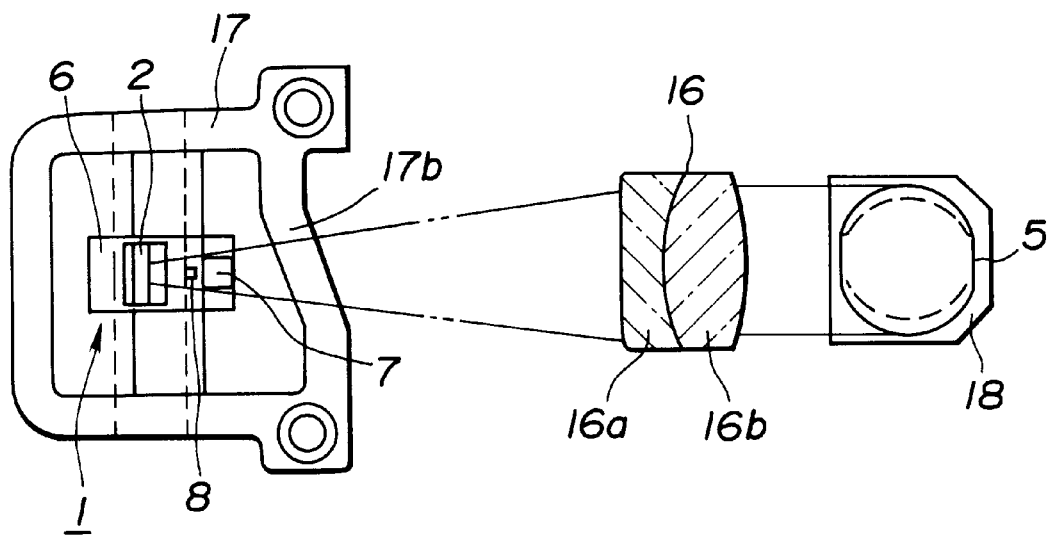
FIG. 33 is a plan view showing a structure in which the light reception/emission element according to the present invention is contained in a transparent case.
Figure 34:
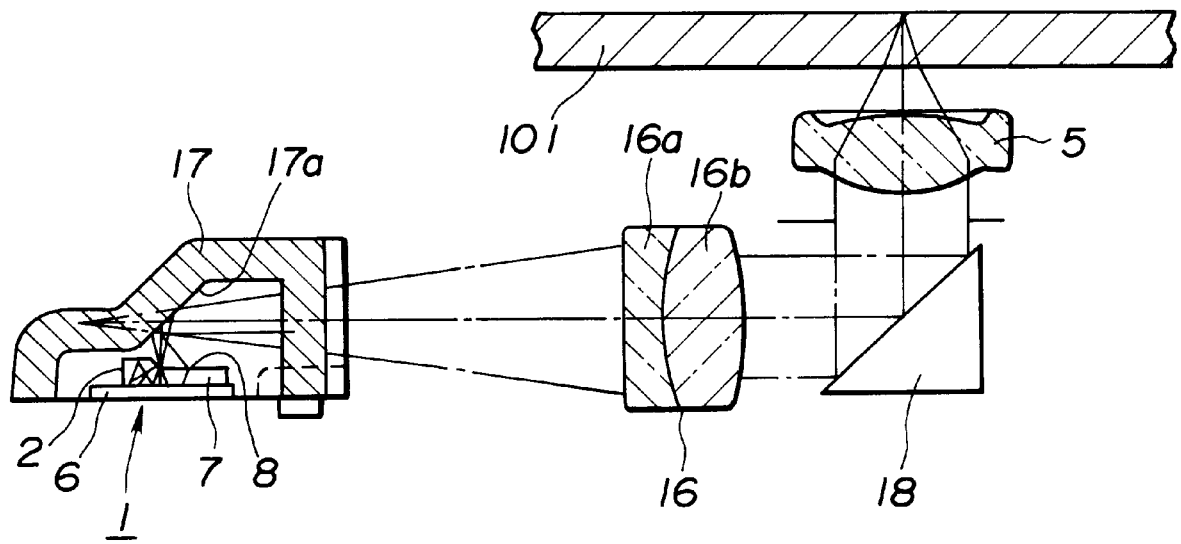
FIG. 34 is a longitudinal sectional view showing a structure in which the light reception/emission element according to the present invention is contained in a transparent case.

The light reception/emission element 1 may be contained in a case 17 as shown in FIGS. 33, 34. The case is formed of transparent material such as polymethylmethacrylate. Beam emitted from the light reception/emission element 1 and polarized by reflection on the inclined plate 2b is reflected by the inclined top face 17a of the case 17, passes through the inclined plate 17b formed on a side of the case 17 and then is projected outward of the case 17. The inclined plate 17b corrects astigmatism contained by beam emitted from the semiconductor laser chip 8, on the signal recording surface of the magnetic optical disc 101. The beam emitted from this case 17 is made to parallel beam by a collimator lens 16 and projected to the objective lens 5 through a refracting mirror 18. The collimator lens 16 is formed by bonding together a concave lens 16a and a convex lens 16b.

In the disk player apparatus of the present invention, it is permissible to use a hologram lens instead of the above objective lens, as a beam collecting means. In this case, because the hologram lens can be produced so as to include a function of a beam splitter or Wallaston prism, the prism 2 may be substituted by this hologram lens.

What is claimed is:

1. An optical pickup device comprising:

a light source disposed on a semiconductor substrate;

a first signal reading optical detector;

a second signal reading optical detector;

a third signal reading optical detector; and a prism made of double refractive material, having a bottom face and a top face, which are in parallel to each other and an inclined face which is inclined with respect to said bottom face and acts as a beam branching surface, wherein an optical axis in a case when said double refractive material is uniaxial crystal or an azimuth corresponding to a refraction factor having a difference larger from a middle refraction factor, of three refraction factor azimuths when said double refractive material is biaxial crystal is set within a plane perpendicular to normal lines of said top face and bottom face, said prism being bonded to a top surface of said semiconductor substrate with said bottom face being located over said respective signal reading optical detectors and said inclined face being made to oppose said light source, said prism being so constructed that beam emitted by said light source, reflected by said inclined face and then irradiated to a signal recording surface of a magnetic optical recording medium is reflected by said signal recording surface and returned to said inclined face as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors, at least, such signal reading optical detectors for receiving extraordinary ray in said reflective beam, of said first-third signal reading optical detectors, being formed with central positions thereof being apart from each other relative to an intersection line between a plane including an optical axis of beam emitted from said light source and an optical axis of beam reflected by said inclined face, and the top surface of said semiconductor substrate, while said first–third signal reading optical detectors are allocated asymmetrically with each other, with respect to said intersectional line.

2. An optical pickup device according to claim 1 wherein directions for deviation of the first-third signal reading optical detectors with respect to said intersectional line are the same.

3. An optical pickup device according to claim 1 wherein said prism is formed of uniaxial crystal $LiNbO_3$.

4. An optical pickup device according to claim 1 wherein said prism is formed of uniaxial crystal $KTiOPO_4$.

5. An optical pickup device according to claim 1 wherein said prism is formed of uniaxial crystal $YVO_4$.

6. An optical pickup device comprising:

a medium holding mechanism for holding a magnetic optical recording medium;

a light source disposed on a semiconductor substrate;

a first signal reading optical detector;

a second signal reading optical detector;

a third signal reading optical detector; and a prism made of double refractive material, having a bottom face and a top face, which are in parallel to each other, wherein an optical axis in a case when said double refractive material is uniaxial crystal or an azimuth corresponding to a refraction factor having a difference larger from a middle refraction factor, of three refraction factor azimuths when said double refractive material is biaxial crystal is set within a plane perpendicular to normal lines of said top face and bottom face, said prism further having an inclined face which is inclined with respect to said bottom face and acts as a beam branching surface, and being bonded to a top surface of said semiconductor substrate with said bottom face being located over said respective signal reading optical detectors and said inclined face being made to oppose said light source, said prism being so constructed that beam emitted by said light source, reflected by said inclined face and then converged by a beam converging means on a signal recording surface of a magnetic optical recording medium is reflected by said signal recording surface and returned to said inclined face through said beam converging means, as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors, said optical pickup device further comprising an operation circuit for executing an arithmetic operation based on optical detection output sent by said respective signal reading optical detectors, at least, such signal reading optical detectors for receiving extraordinary ray in said reflective beam, of said first-third signal reading optical detectors, being formed with central positions thereof being apart from each other relative to an intersectional line between a plane including an optical axis of beam emitted from said light source and an optical axis of beam reflected by said inclined face and the top surface of said semiconductor substrate, while said first–third signal reading optical detectors are allocated asymmetrically with each other, with respect to said intersectional line.

7. An optical pickup device comprising:

a light source disposed on a semiconductor substrate;

a first signal reading optical detector;

a second signal reading optical detector;

a third signal reading optical detector; and a prism made of double refractive material, having a bottom face and a top face, which are in parallel to each other and an inclined face which is inclined with respect to said bottom face and acts as a beam branching surface, wherein an optical axis in a case when said double refractive material is uniaxial crystal or an azimuth corresponding to a refraction factor having a difference larger from a middle refraction factor, of three refraction factor azimuths when said double refractive material is biaxial crystal is set within a plane perpendicular to normal lines of said top face and bottom face, said prism being bonded to a top surface of said semiconductor substrate with said bottom face being located over said respective signal reading optical detectors and said inclined face being made to oppose said light source, said prism being so constructed that beam emitted by said light source, reflected by said inclined face and then irradiated to a recording track on a signal recording surface of a magnetic optical recording medium is reflected by said signal recording surface and returned to said inclined face as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors, light reception surface of said first signal reading optical detector being divided to at least two division light reception portions such that a differential in optical output signal among said division light reception portions causes a tracking error signal corresponding to a distance between a position in which said beam is irradiated, on the signal recording surface of said magnetic optical recording medium and said recording track to be detected.

8. An optical pickup device comprising:

a light source disposed on a semiconductor substrate;

a first signal reading optical detector;

a second signal reading optical detector;

a third signal reading optical detector; and a prism made of double refractive material, having a bottom face and a top face, which are in parallel to each other and an inclined face which is inclined with respect to said bottom face and acts as a beam branching surface, wherein an optical axis in a case when said double refractive material is uniaxial crystal or an azimuth corresponding to a refraction factor having a difference larger from a middle refraction factor, of three refraction factor azimuths when said double refractive material is biaxial crystal, is set within a plane perpendicular to normal lines of said top face and bottom face, said prism being bonded to a top surface of said semiconductor substrate with said bottom face being located over said respective signal reading optical detectors and said inclined face being made to oppose said light source, said prism being so constructed that beam emitted by said light source, reflected by said inclined face and then irradiated to a recording track on a signal recording surface of a magnetic optical recording medium is reflected by said signal recording surface and returned to said inclined face as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors, light reception surfaces of said second and third signal reading optical detectors being divided to at least two division light reception portions such that a differential in optical output signal among said division light reception portions causes a tracking error signal corresponding to a distance between a position in which said beam is irradiated, on the signal recording surface of said magnetic optical recording medium and said recording track to be detected.

9. An optical pickup device according to claim 2 wherein the light reception surface of said first signal reading optical detector is divided to at least two division light reception portions, so that a differential in optical detection signal between the division light reception portion of said first signal reading optical detector and the division light reception portion of said second signal reading optical detector and/or the division light reception portion of said third signal reading optical detector causes the tracking error signal to be detected.

10. An optical pickup device comprising:
a medium holding mechanism for holding a magnetic optical recording medium;
a light source disposed on a semiconductor substrate;
a first signal reading optical detector;
a second signal reading optical detector;
a third signal reading optical detector; and
a prism made of double refractive material, having a bottom face and a top face, which are in parallel to each other, wherein an optical axis in a case when said double refractive material is uniaxial crystal or an azimuth corresponding to a refraction factor having a difference larger from a middle refraction factor, of three refraction factor azimuths when said double refractive material is biaxial crystal is set within a plane perpendicular to normal lines of said top face and bottom face,
said prism further having an inclined face which is inclined with respect to said bottom face and acts as a beam branching surface, and being bonded to a top surface of said semiconductor substrate with said bottom face being located over said respective signal reading optical detectors and said inclined face being made to oppose said light source,
said prism being so constructed that beam emitted by said light source, reflected by said inclined face and then converged by a beam converging means on a signal recording surface of a magnetic optical recording medium is reflected by said signal recording surface and returned to said inclined face through said beam converging means, as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors,
said optical pickup device further comprising an operation circuit for executing an arithmetic operation based on optical detection output sent by said respective signal reading optical detectors,
the light reception surface of said first signal reading optical detector being divided to at least two division light reception portions,
said operation circuit detecting a tracking error signal corresponding to a distance between a position in which said beam is irradiated, on the signal recording surface of said magnetic optical recording medium and said recording track, depending on a differential in the optical output signal among the division light reception portions.

11. An optical pickup device comprising:
a medium holding mechanism for holding a magnetic optical recording medium;
a light source disposed on a semiconductor substrate;
a first signal reading optical detector;
a second signal reading optical detector;
a third signal reading optical detector; and
a prism made of double refractive material, having a bottom face and a top face, which are in parallel to each other, wherein an optical axis in a case when said double refractive material is uniaxial crystal or an azimuth corresponding to a refraction factor having a difference larger from a middle refraction factor, of three refraction factor azimuths when said double refractive material is biaxial crystal is set within a plane perpendicular to normal lines of said top face and bottom face,
said prism further having an inclined face which is inclined with respect to said bottom face and acts as a beam branching surface, and being bonded to a top surface of said semiconductor substrate with said bottom face being located over said respective signal reading optical detectors and said inclined face being made to oppose said light source,
said prism being so constructed that beam emitted by said light source, reflected by said inclined face and then converged by a beam converging means on a signal recording surface of a magnetic optical recording medium is reflected by said signal recording surface and returned to said inclined face through said beam converging means, as reflective beam, said reflective beam being made to enter said prism through said inclined face so as to divide into two groups of beams, so that part of said reflective beam is introduced to said first signal reading optical detector through said bottom face and then beam reflected by said bottom face, of said reflective beam is reflected by said top face so as to reach said second and third signal reading optical detectors,
said optical pickup device further comprising an operation circuit for executing an arithmetic operation based on optical detection output sent by said respective signal reading optical detectors, the light reception surfaces of said second and/or the third signal reading optical detector being divided to at least two division light reception portions, said operation circuit detecting a tracking error signal corresponding to a distance between a position in which said beam is irradiated, on the signal recording surface of said magnetic optical recording medium and said recording track, depending on a differential in the optical output signal among the division light reception portions.

* * * * *

UNITED STATES PATENT AND TRADEMARK OFFICE
CERTIFICATE OF CORRECTION

PATENT NO. : 5,903,529
DATED : May 11, 1999
INVENTOR(S) : Noriaki Nishi, et al.

It is certified that error appears in the above-indentified patent and that said Letters Patent is hereby corrected as shown below:

Column 6, line 35, after "FIG. 32" insert --A-C--.

Signed and Sealed this

Twenty-third Day of November, 1999

Attest:

Q. TODD DICKINSON

*Attesting Officer*       *Acting Commissioner of Patents and Trademarks*